(12) United States Patent
Imai et al.

(10) Patent No.: US 6,424,899 B2
(45) Date of Patent: Jul. 23, 2002

(54) ACTIVATION CONTROL APPARATUS OF OCCUPANT SAFETY SYSTEM

(75) Inventors: Katsuji Imai, Nagoya; Motomi Iyoda, Seto, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/978,061

(22) Filed: Oct. 17, 2001

Related U.S. Application Data

(62) Division of application No. 09/499,309, filed on Feb. 7, 2000, now Pat. No. 6,327,527.

(30) Foreign Application Priority Data

Feb. 9, 1999 (JP) ............................................. 11-031799
May 17, 1999 (JP) ............................................. 11-136096

(51) Int. Cl.[7] ................................................ G06E 7/00
(52) U.S. Cl. ........................... 701/45; 240/735; 701/46
(58) Field of Search ............................. 701/45, 46, 47; 180/282; 280/734, 735; 340/436; 307/10.1

(56) References Cited

U.S. PATENT DOCUMENTS

| | | | |
|---|---|---|---|
| 5,014,810 A | 5/1991 | Mattes et al. ............... | 180/268 |
| 5,407,228 A | 4/1995 | Shibata et al. .............. | 280/735 |
| 5,496,979 A | 3/1996 | Behr ....................... | 200/61.45 |
| 5,559,697 A | 9/1996 | Wang ..................... | 364/424.05 |
| 5,668,720 A | 9/1997 | Takahashi et al. | |
| 5,732,374 A | 3/1998 | Ohm | |
| 5,740,041 A | 4/1998 | Iyoda | |
| 5,785,347 A | 7/1998 | Adolph et al. ............... | 280/735 |
| 5,815,393 A | 9/1998 | Chae ......................... | 364/424 |
| RE36,122 E | 3/1999 | Mattes et al. ................ | 180/268 |
| 6,170,864 B1 | 1/2001 | Fujita et al. | |

FOREIGN PATENT DOCUMENTS

| | | |
|---|---|---|
| JP | 4-72060 | 6/1992 |
| JP | 5-38998 | 2/1993 |
| JP | 5-65706 | 8/1993 |
| JP | 5-213150 | 8/1993 |
| JP | 5-286407 | 11/1993 |
| JP | 5-305855 | 11/1993 |
| JP | 6-321051 | 11/1994 |
| JP | 6-340244 | 12/1994 |
| JP | 7-96816 | 4/1995 |
| JP | 10-29494 | 2/1998 |
| JP | 10-86788 | 4/1998 |
| JP | 10-152014 | 6/1998 |
| JP | 10-166993 | 6/1998 |
| JP | 10-287203 | 10/1998 |

Primary Examiner—Richard M. Camby
(74) Attorney, Agent, or Firm—Kenyon & Kenyon

(57) ABSTRACT

An activation control apparatus of an occupant safety system is an activation control apparatus 2 for controlling activation of airbag system 36 mounted on a vehicle in the event of the vehicle colliding with an obstacle, which has a front sensor 30B mounted in the left part of the vehicle, a front sensor 30A mounted in the right part of the vehicle, a collision type identifying part 42 for identifying a type of collision of the vehicle, based on values detected by the front sensor 30B and the front sensor 30A, and an activation control 40 for controlling the activation of the airbag system 36, based on the type of the collision identified by the collision type identifying part 42.

4 Claims, 29 Drawing Sheets

LEFT FRONT G

RIGHT FRONT G

RIGHT FRONT P

LEFT FRONT P

RIGHT FRONT P

LEFT FRONT P

POLE/UNDERRIDE MAP

ODB MAP

ORB MAP

OFFSET CRASH/ODB CRASH MAP

FRONTAL CRASH/SOFT CRASH

UNEVENNESS RATIO $r = V_A / V_B$

| SOFT CRASH | LIKELIHOOD 1 |
|---|---|
| | LIKELIHOOD 2 |
| | LIKELIHOOD 3 |

Fig.29

DETERMINATION FOR INTERMEDIATE STATES

| FRONTAL CRASH LIKELIHOOD | SOFT CRASH LIKELIHOOD | OFFSET LIKELIHOOD | ODB LIKELIHOOD | MAP SELECTED |
|---|---|---|---|---|
| 1~2 | 1~3 | — | * | SOFT CRASH1~3 |
| 3 | 3 | — | 1~2 | ODB2~3 |
| 3 | 3 | — | 3 | SOFT CRASH3 |
| 3 | 2 | — | 1~2 | ODB2~3 |
| 3 | 2 | — | 3 | SOFT CRASH2 |
| 3 | 1 | — | * | SOFT CRASH1 |
| — | * | 1~2 | 1~3 | ODB1~3 |
| — | 1~2 | 3 | 3 | SOFT CRASH3 |
| — | 3 | 3 | 3 | ODB3 |
| — | 1~2 | 3 | 2 | SOFT CRASH3 |
| — | 3 | 3 | 2 | ODB2 |
| — | * | 3 | 1 | ODB1 |

Th2,Tc2 TABLE

| PEAK HOLD VALUE | Th2 | Tc2 |
|---|---|---|
| 7.8 AND SMALLER | 15 | 70 |
| 8.2 | 17 | 50 |
| 8.7 | 20 | 30 |
| 9.2 | 24 | 20 |
| ⋮ | ⋮ | ⋮ |

ACTIVATION CONTROL APPARATUS OF OCCUPANT SAFETY SYSTEM

This is a division of Ser. No. 09/499,309 filed Feb. 7, 2000 now U.S. Pat. No. 6,327,527.

BACKGROUND OF THE INVENTION

1. Field of the Invention

The present invention relates to an activation control apparatus of an occupant safety system for controlling activation of the occupant safety system which provides protection for vehicle occupants in the event of a vehicle collision.

2. Related Background Art

The vehicles now available are often equipped with an airbag system for providing the protection for vehicle occupants in the event of a vehicle collision. This airbag system has a sensor for detecting impact upon collision of the vehicle and is activated based on the impact detected by this sensor.

Incidentally, types of vehicle collision include a variety of crash types such as a frontal crash, an offset crash, and so on. In order to be able to detect the collision of the vehicle in the event of any type of crash, there exist the airbag systems constructed in such structure that sensors are located at plural positions in the vehicle and that the airbag system is activated based on detection of the collision of the vehicle by the plurality of sensors. (Reference is made to Japanese Patent Application Laid-Open No. 5-38998.)

SUMMARY OF THE INVENTION

In the airbag systems described above, the vehicle collision was able to be detected in the event of any type of collision, but it was difficult to activate the airbag system with accuracy in accordance with either of the crash types, because the crash types were not discriminated from each other.

An object of the present invention is to provide an activation control apparatus of an occupant safety system that can discriminate the crash types of the vehicle from each other with accuracy and that can activate the occupant safety system with accuracy in accordance with either of the crash types.

An activation control apparatus of an occupant safety system according to the present invention is an apparatus for controlling activation of the occupant safety system mounted on a vehicle in the event of the vehicle colliding with an obstacle, the apparatus comprising a plurality of impact detecting means mounted at mutually different positions in a front part of the vehicle, collision type identifying means for identifying a type of collision of the vehicle, based on values detected by the plurality of impact detecting means, and activation control means for controlling the activation of the vehicle safety system, based on a type of collision identified by the collision type identifying means. The front part of the vehicle herein means the vicinity of the bumper at the front end of the vehicle, the vicinity of the front ends of the front side members, the areas on the front side members, the area on the dash panel, and so on.

Since the activation control apparatus of the occupant safety system can identify the type of collision of the vehicle by the collision type identifying means, the activation control means can activate the occupant safety system more accurately.

The activation control apparatus of the occupant safety system is also characterized in that the plurality of impact detecting means comprise first impact detecting means mounted in a left part of the vehicle and second impact detecting means mounted in a right part of the vehicle and in that if after the collision of the vehicle there is a time difference between rises of values detected by the first impact detecting means and by the second impact detecting means the collision type identifying means identifies the collision as an oblique crash. Here the left part of the vehicle and the right part of the vehicle mean the vicinity of the left and right ends of the bumper, the vicinity of the left and right front side members, the areas on the left and right front side members, the vicinity of the left and right ends of the dash panel, and so on.

The activation control apparatus of the occupant safety system can identify the collision of the vehicle as an oblique crash by the collision type identifying means. Namely, since in the event of the oblique crash relatively small impact acts on the bumper at the front end of the vehicle to cause a time difference between rises of the values detected by the first impact detecting means and by the second impact detecting means, the collision can be identified as an oblique crash.

The activation control apparatus of the occupant safety system is also characterized in that the plurality of impact detecting means comprise first impact detecting means mounted in a left part of the vehicle and second impact detecting means mounted in a right part of the vehicle and in that if after the collision of the vehicle there is a time difference between rises of values detected by the first impact detecting means and by the second impact detecting means and if a difference is large between magnitudes of the values detected by the first impact detecting means and by the second impact detecting means the collision type identifying means identifies the collision as an offset crash.

The activation control apparatus of the occupant safety system can identify the collision of the vehicle as an offset crash by the collision type identifying means. Namely, since in the event of the offset crash either one of the first impact detecting means and the second impact detecting means detects greater impact, the collision can be identified as an offset crash.

Another activation control apparatus of an occupant safety system is an apparatus for controlling activation of the occupant safety system mounted on a vehicle in the event of the vehicle colliding with an obstacle, the apparatus comprising first impact detecting means mounted in a left front part of the vehicle, second impact detecting means mounted in a right front part of the vehicle, likelihood computing means for classifying collision of the vehicle under a frontal crash, an offset crash, and an oblique crash, based on values detected by the first impact detecting means and by the second impact detecting means, and computing a likelihood of the collision classified, and activation control means for controlling the activation of the occupant safety system, based on the likelihood computed by the likelihood computing means.

In the activation control apparatus of the occupant safety system the likelihood computing means classifies the collision of the vehicle under the frontal crash, the offset crash, and the oblique crash, based on the values detected by the first impact detecting means and by the second impact detecting means, and computes the likelihood of the collision classified. Therefore, the activation control apparatus can determine the type of collision of the vehicle accurately and activate the occupant safety system with accuracy.

The activation control apparatus of the occupant safety system is also characterized in that when the likelihood computing means classifies the collision as an oblique crash and computes the likelihood of the oblique crash, the activation control means controls the activation of the occupant safety system with reference to an oblique crash threshold corresponding to the likelihood of the oblique crash.

The activation control apparatus of the occupant safety system is also characterized in that when the likelihood computing means classifies the collision as an offset crash and computes the likelihood of the offset crash, the activation control means controls the activation of the occupant safety system with reference to an offset crash threshold corresponding to the likelihood of the offset crash.

The activation control apparatus of the occupant safety system is also characterized in that when the likelihood computing means classifies the collision as an ODB crash and computes the likelihood of the ODB crash, the activation control means controls the activation of the occupant safety system with reference to an ODB crash threshold corresponding to the likelihood of the ODB crash.

The activation control apparatus of the occupant safety system is also characterized in that the ODB crash threshold is set as follows; in a small deceleration range from occurrence of the collision a threshold corresponding to a strong-likelihood ODB crash is lower than a threshold corresponding to a small-likelihood ODB crash and in a large deceleration range from occurrence of the collision a threshold corresponding to the strong-likelihood ODB crash is higher than a threshold corresponding to the small-likelihood ODB crash.

The activation control apparatus of the occupant safety system is also characterized in that when the likelihood computing means classifies the collision as a soft crash and computes the likelihood of the soft crash, the activation control means controls the activation of the occupant safety system with reference to a soft crash threshold corresponding to the likelihood of the soft crash.

The activation control apparatus of the occupant safety system is also characterized in that in a small deceleration range from occurrence of the collision a soft crash threshold corresponding to a strong-likelihood soft crash is lower than a soft crash threshold corresponding to a small-likelihood soft crash and in a large deceleration range from occurrence of the collision a soft crash threshold corresponding to the strong-likelihood soft crash is higher than a soft crash threshold corresponding to the small-likelihood soft crash.

In the activation control apparatus of the occupant safety system the likelihood computing means classifies the collision under the oblique crash, the offset crash, the ODB crash, and the soft crash and computes the likelihood of the collision classified. The activation control means controls the activation of the occupant safety system with reference to the threshold corresponding to the likelihood of the collision classified. The apparatus can activate the occupant safety system at accurate timing accordingly.

The activation control apparatus of the occupant safety system is also characterized in that the likelihood computing means classifies the collision of the vehicle under a frontal crash, an offset crash, and an oblique crash, based on a ratio of the values detected by the first impact detecting means and by the second impact detecting means, and computes a likelihood of the collision classified.

The activation control apparatus of the occupant safety system is also characterized in that the likelihood computing means classifies the collision of the vehicle as a frontal crash when the ratio of the values is large, classifies the collision as an oblique collision when the ratio of the values is small, or classifies the collision of the vehicle as an offset crash when the ratio of the values is intermediate.

In the activation control apparatus of the occupant safety system the likelihood computing means classifies the collision of the vehicle under the frontal crash, the offset crash, and the oblique crash, based on the ratio of the values detected by the first impact detecting means and by the second impact detecting means and, therefore, the collision can be classified under the crash types with accuracy.

The activation control apparatus of the occupant safety system is also characterized in that the likelihood computing means classifies the collision of the vehicle under an ODB crash and an ORB crash, based on an initial deviation between the values detected by the first impact detecting means and by the second impact detecting means, and computes a likelihood of the ODB crash, based on the initial deviation, when the collision of the vehicle is classified as an ODB crash.

The activation control apparatus of the occupant safety system is also characterized in that the likelihood computing means determines that the likelihood of the ODB crash is strong when the initial deviation is large, or the likelihood computing means determines that the likelihood of the ODB crash is small when the initial deviation is small.

In the activation control apparatus of the occupant safety system the likelihood computing means classifies the collision of the vehicle under the ODB crash and the ORB crash and computes the likelihood of the ODB crash, based on the initial deviation between the values detected by the first impact detecting means and by the second impact detecting means, and, therefore, it can classify the collision under the crash types with accuracy and compute the accurate likelihood thereof.

The activation control apparatus of the occupant safety system is also characterized in that the likelihood computing means determines whether the collision of the vehicle is the ODB crash, based on the magnitude of the difference between the values detected by the first impact detecting means and by the second impact detecting means, and computes a likelihood of the ODB crash, based on the magnitude of the difference between the values detected, when it is determined that the collision of the vehicle is the ODB crash.

The activation control apparatus of the occupant safety system is also characterized in that the likelihood computing means determines that the likelihood of the ODB crash is strong if the magnitude of the difference between the values detected is large, or determines that the likelihood of the ODB crash is small if the initial deviation is small.

In the activation control apparatus of the occupant safety system the likelihood computing means determines whether the collision of the vehicle is the ODB crash, based on the magnitude of the difference between the values detected by the first impact detecting means and by the second impact detecting means, and computes the likelihood of the ODB crash and, therefore, it can classify the collision under the crash types with accuracy and compute the accurate likelihood thereof.

The activation control apparatus of the occupant safety system is also characterized in that the activation control apparatus comprises impact measuring means placed in the vehicle, the likelihood computing means determines whether the collision of the vehicle is a soft crash, based on a state of unevenness of a temporal change waveform of a measurement measured by the impact measuring means, and the likelihood computing means computes a likelihood of the soft crash, based on the unevenness of the temporal change waveform of the measurement when it is determined that the collision of the vehicle is the soft crash.

The activation control apparatus of the occupant safety system is also characterized in that when the unevenness of the temporal change waveform of the measurement is large, the likelihood computing means determines that the likelihood of the soft crash is strong and in that when the unevenness of the temporal change waveform of the measurement is small, the likelihood computing means determines that the likelihood of the soft crash is small.

In the activation control apparatus of the occupant safety system the likelihood computing means determines whether the collision of the vehicle is the soft crash, based on the state of unevenness of the temporal change waveform of the measurement measured by the impact detecting means, and determines the likelihood of the soft crash, also based thereon, and, therefore, it can determine the type of the collision with accuracy and compute the accurate likelihood thereof.

Another activation control apparatus of an occupant safety system is an apparatus for controlling activation of the occupant safety system mounted in a vehicle in the event of the vehicle colliding with an obstacle, the apparatus comprising impact measuring means placed in the vehicle, soft crash determining means for determining whether the collision of the vehicle is a soft crash, based on a state of unevenness of a temporal change waveform of a measurement measured by the impact measuring means, and activation control means for controlling the activation of the occupant safety system, based on a soft crash activation determination map, when the soft crash determining means determines that the collision is the soft crash.

In the activation control apparatus of the occupant safety system the soft crash determining means determines whether the collision of the vehicle is the soft crash, based on the state of unevenness of the temporal change waveform of the measurement measured by the impact measuring means. Therefore, the apparatus can accurately determine whether the collision is the soft crash and can activate the occupant safety system with accuracy.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 29 is a table used in the determination of crash type carried out in the activation control apparatus of the airbag system according to the second embodiment;

DESCRIPTION OF THE PREFERRED EMBODIMENTS

The activation control apparatus of the occupant safety system according to the first embodiment of the present invention will be described with reference to the drawings.

Figure 1:
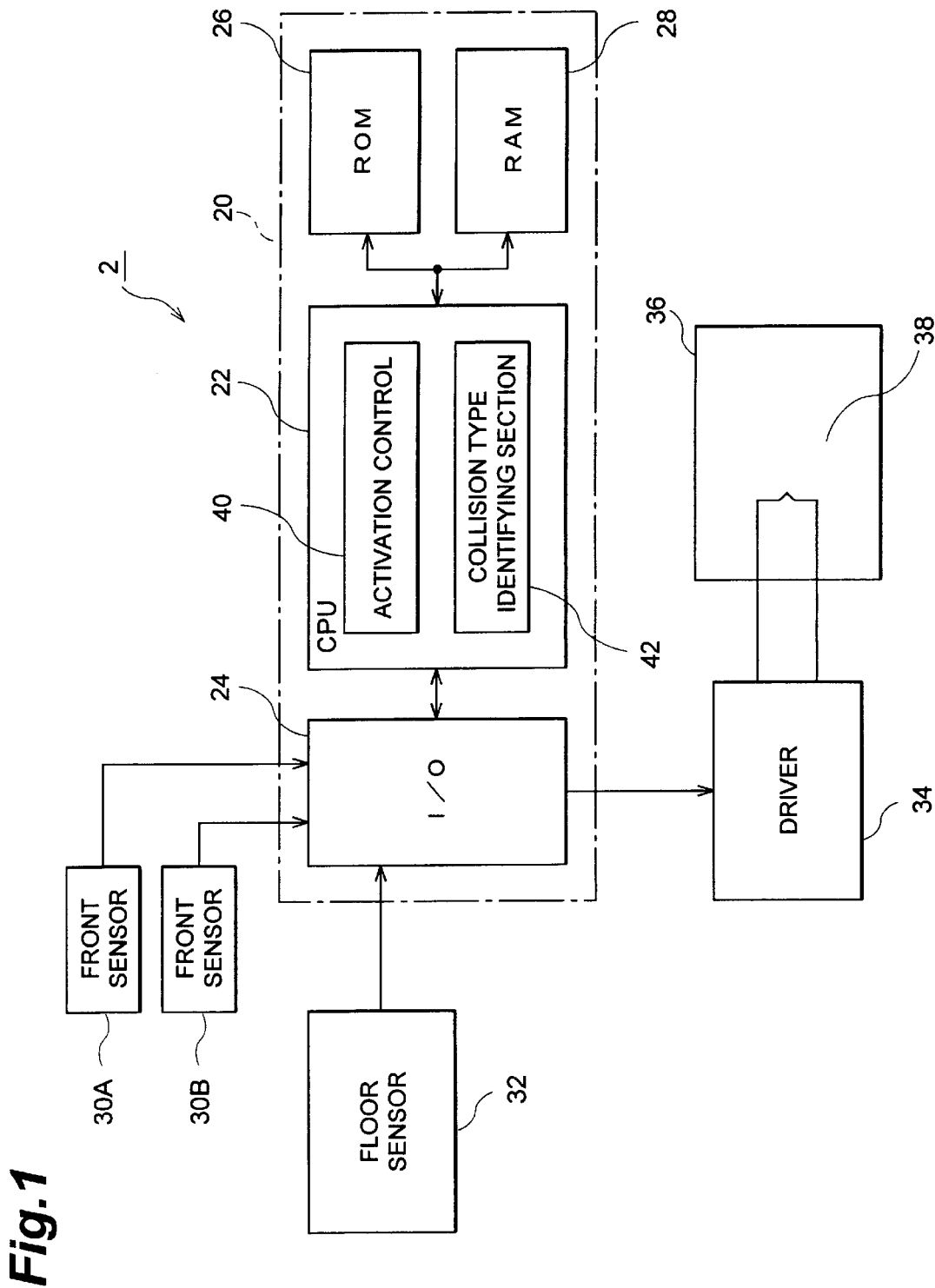
FIG. 1 is a block structural diagram of the activation control apparatus of the airbag system according to the first embodiment.

As illustrated in FIG. 1, the activation control apparatus 2 of the airbag system is an apparatus for controlling activation of the airbag system 36 and is mainly composed of a control circuit 20, a front sensor (second impact detecting means) 30A, a front sensor (first impact detecting means) 30B, a floor sensor 32, and a driving circuit 34.

Among them, the front sensors 30A, 30B are electronic sensors for detecting the magnitude of impact exerted on the vehicle, which are mounted in the front part of the vehicle. Specifically, they detect decelerations acting on the vehicle and output deceleration signals G'(t) in time series corresponding to the decelerations. The floor sensor 32 is a so-called acceleration sensor for measuring the impact exerted on the vehicle and transmitted through the vehicle body. Specifically, it measures decelerations acting in the longitudinal direction on the vehicle as occasion arises, and outputs deceleration signals G(t) in time series corresponding to the measurements (decelerations).

The control circuit 20 is comprised of a central processing unit (CPU) 22, an input/output circuit (I/O circuit) 24, a read only memory (ROM) 26, a random access memory (RAM) 28, and so on, and the components are connected through a bus. Among these components, the CPU 22 executes control of the activation of the airbag system 36 according to programs etc. stored in the ROM 26. The RAM 28 is a memory for storing data obtained based on the signals from the front sensors 30A, 30B and the floor sensor 32, results computed based thereon by the CPU 22, and so on. Further, the I/O circuit 24 is a circuit for input of the signals from the front sensors 30A, 30B and the floor sensor 32, for output of an activation signal to the driving circuit 34, and so on.

The CPU 22 functions as an activation control 40 for comparing a value obtained based on the value detected by the floor sensor 32, with a predetermined threshold and controlling the activation of the airbag system 36, based on the result of the comparison, and also as a collision type identifying section 42 for identifying the type of collision of the vehicle 46, based on the values detected by the front sensors 30A, 30B, and the like.

The driving circuit 34 is a circuit for energizing a squib 38 of an inflator in the airbag system 36 in response to the activation signal from the control circuit 20 to fire a gas generator. Further, the airbag system 36 includes the gas generator (not illustrated) fired by the squib 38, a bag (not illustrated) inflated by evolving gas, and so on, in addition to the squib 38 of a firing device.

Figure 2:
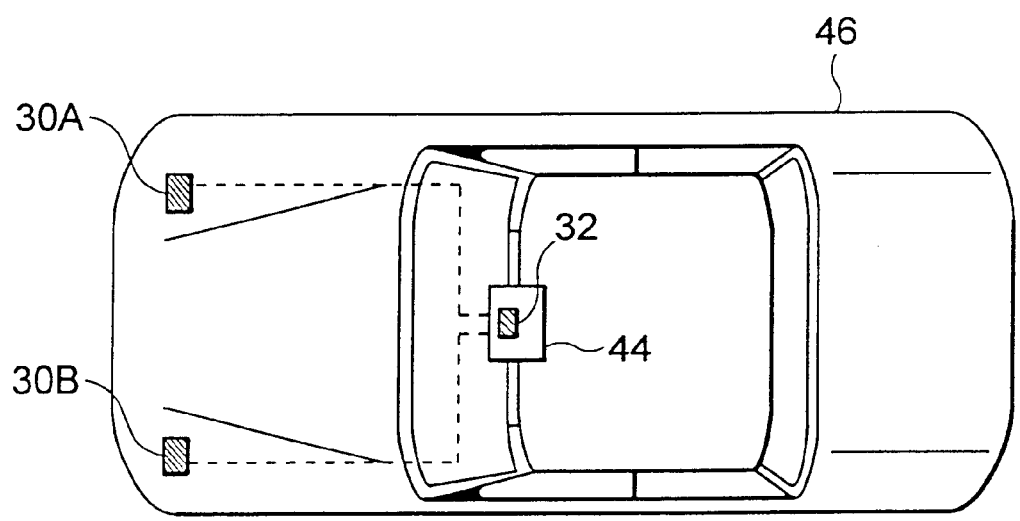
FIG. 2 is a diagram for explaining an on-vehicle state of front sensors etc. of the airbag system according to the first embodiment.

Among these components, the control circuit 20, the floor sensor 32, and the driving circuit 34 are housed in an ECU (electronic control unit) 44 illustrated in FIG. 2, which is mounted on the floor tunnel located approximately in the center in the vehicle 46. The front sensor 30A is mounted on the right front side member of the vehicle 46 obliquely right ahead of the floor sensor 32 housed in the ECU 44, while the front sensor 30B is mounted on the left front side member of the vehicle 46 obliquely left ahead of the floor sensor 32.

Figure 3:
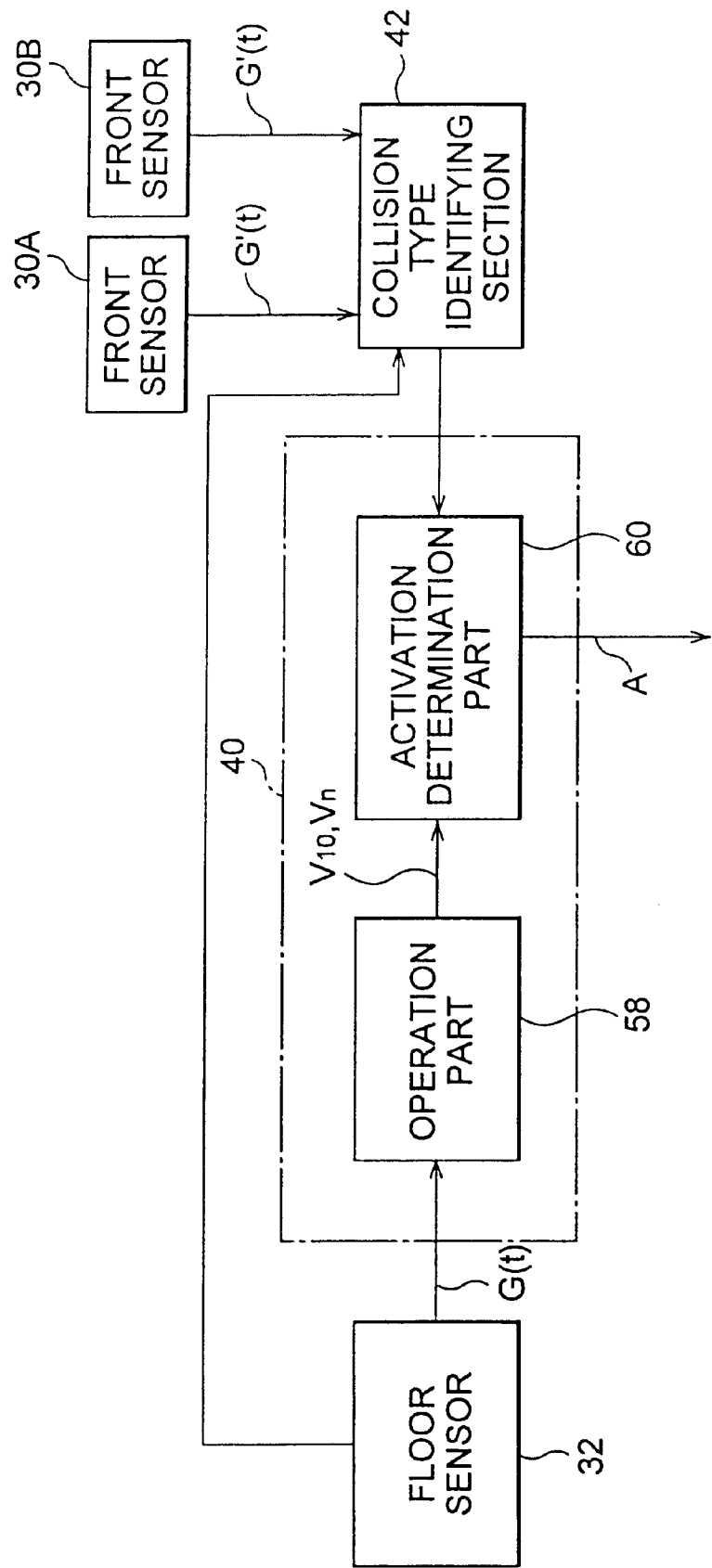
FIG. 3 is a detailed block diagram of an activation control etc. of the activation control apparatus of the airbag system according to the first embodiment.

Next, the control of activation of the airbag system carried out in the CPU 22 will be described referring to FIG. 3, FIG. 4, and FIG. 5. As illustrated in FIG. 3, the activation control 40 in the CPU 22 incorporates an operation part 58 and an activation determination part 60. The floor sensor 32 measures the deceleration exerted in the longitudinal direction on the vehicle 46 as occasion arises, and outputs the signal G(t) indicating the deceleration. When the operation part 58 of the activation control 40 acquires the deceleration G(t) outputted from the floor sensor 32 (step S10 of FIG. 4), it executes predetermined operations with the deceleration G(t), i.e., the operations according to Eq. 1 and Eq. 2 to obtain operation results $V_{10}$, $V_n$ (step S11 of FIG. 4). Here $V_{10}$ is an interval integral of the deceleration G(t) every interval of 10 ms in a period from occurrence of collision to the end of collision, and $V_n$ is an integral of the deceleration G(t) over the time necessary from the occurrence to the end of collision (n is the time of about 100 ms), i.e., the speed change (deceleration) from occurrence of collision.

$$V_{10} = \int_{t-10\,ms}^{t} G(t)\,dt \qquad [\text{Eq. 1}]$$

G(t): output of floor sensor $$V_n = \int G(t) dt \qquad [\text{Eq. 2}]$$

G(t): output of floor sensor

Figure 4:
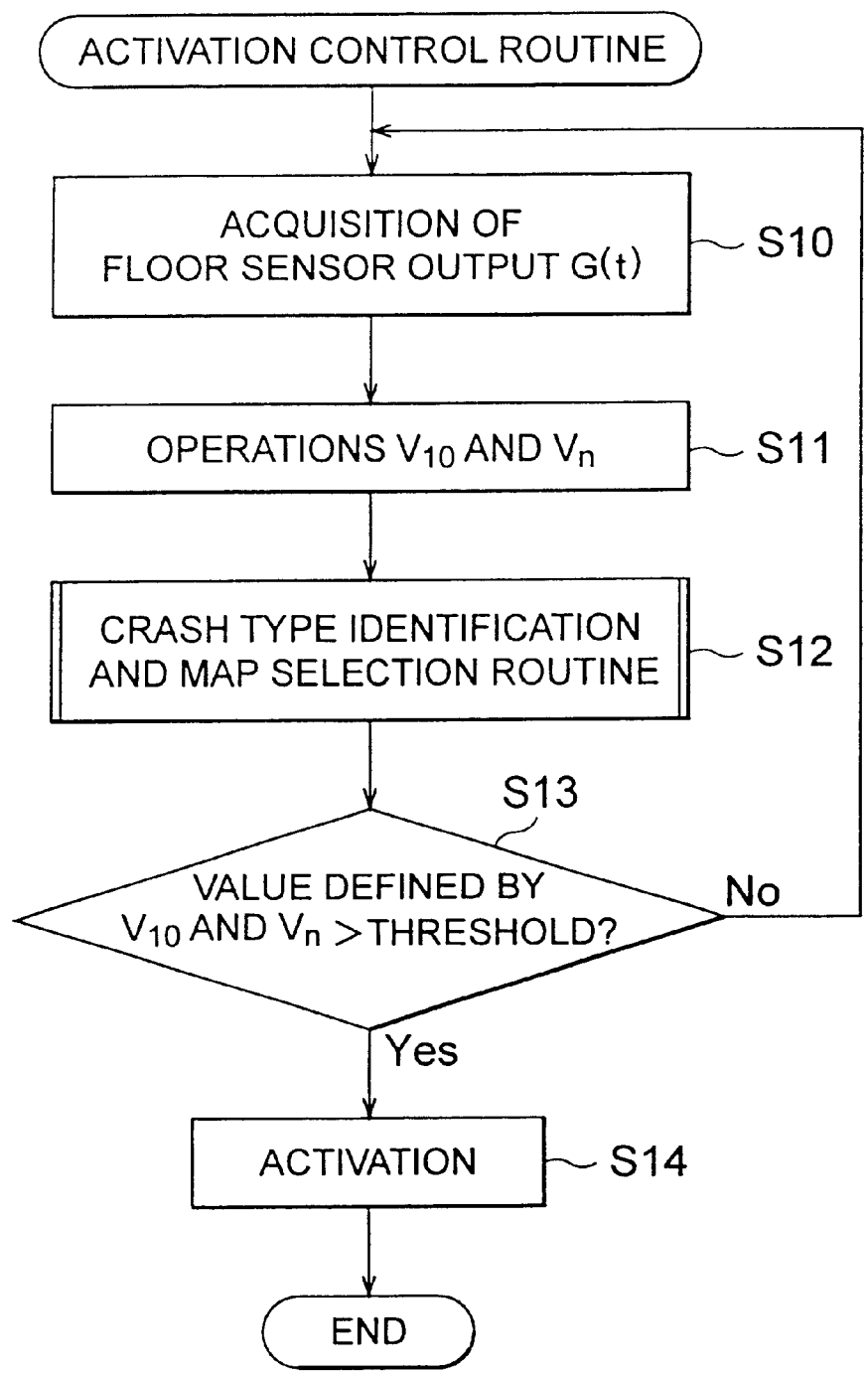
FIG. 4 is a flowchart to show an activation control process in the activation control apparatus of the airbag system according to the first embodiment.
Figure 5:
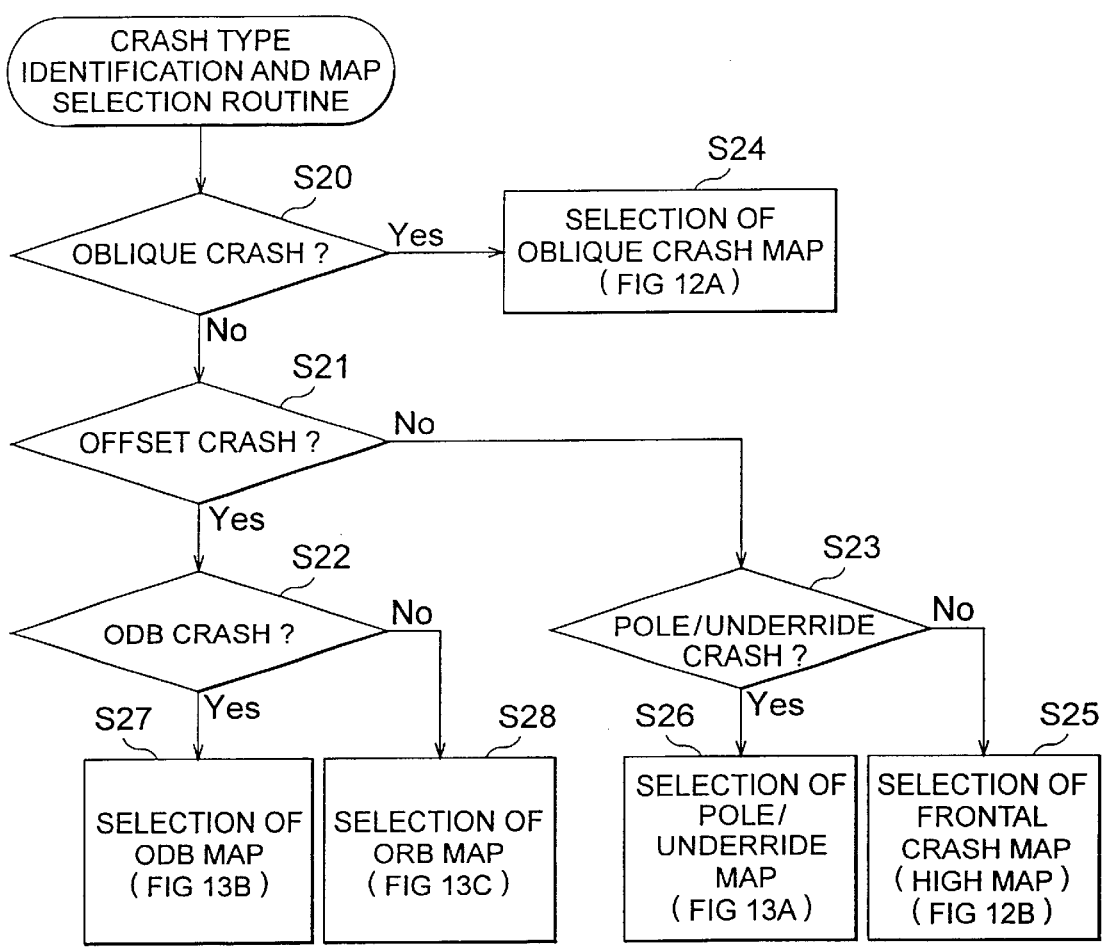
FIG. 5 is a flowchart to show a collision type identifying process in the activation control apparatus of the airbag system according to the first embodiment.

Next, the collision type identifying part 42 shapes the deceleration signal G'(t) outputted from each front sensor 30A, 30B, by a Kalman filter and executes identification of the collision type according to the process shown in the flowchart of FIG. 5, based on the deceleration signals thus shaped and the deceleration signal G(t) outputted from the floor sensor 32 (step S12 of FIG. 4).

First, the collision type identifying part 42 determines whether a type of collision is an oblique crash (step S20). Namely, the collision type identifying part 42 identifies the collision as an oblique crash when a time difference is large between rises of the deceleration signal G'(t) outputted from the front sensor 30A (right front G) and the deceleration signal G'(t) outputted from the front sensor 30B (left front G) (i.e., when the following condition is met; ($V_s$: an integral based on collision-side front G)×(T: a rise delay time of non-collision-side front G)>(threshold)).

Figure 6:
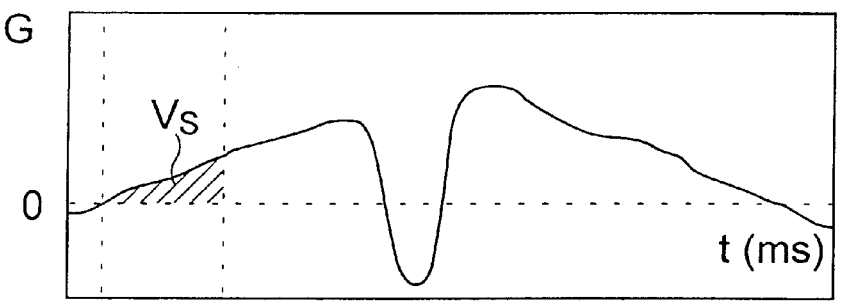
FIG. 6 is graphs to show states of changes in right front G and left front G in the case of an oblique crash in the first embodiment.
Figure 6:
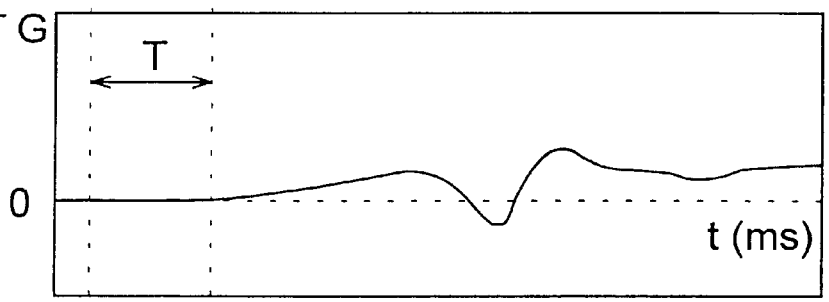

FIG. 6 is the graphs to show states of changes in left front G and right front G appearing when an oblique crash occurs in the left front part of the vehicle 46 during running at a middle speed. As seen from these graphs, the rise of right front G lags behind the rise of the left front G by the delay time T and the condition of ($V_s$)×(T)>(threshold) is met. Therefore, the type of collision is identified as an oblique crash. When this condition is not met, the collision is regarded as a crash except for the oblique crash and further identification of crash type is carried out.

Next, the collision type identifying part 42 determines whether the type of collision is an offset crash (step S21). Namely, the collision type identifying part 42 identifies the collision as an offset crash when there is no time difference between the rises of right front G and left front G and when a difference is large between maximums thereof (i.e., when the condition of rR=$V_{R1}$ (an integral of collision-side front G)/$V_{R2}$ (an integral of non-collision-side front G)>>1 is met).

Figure 7:
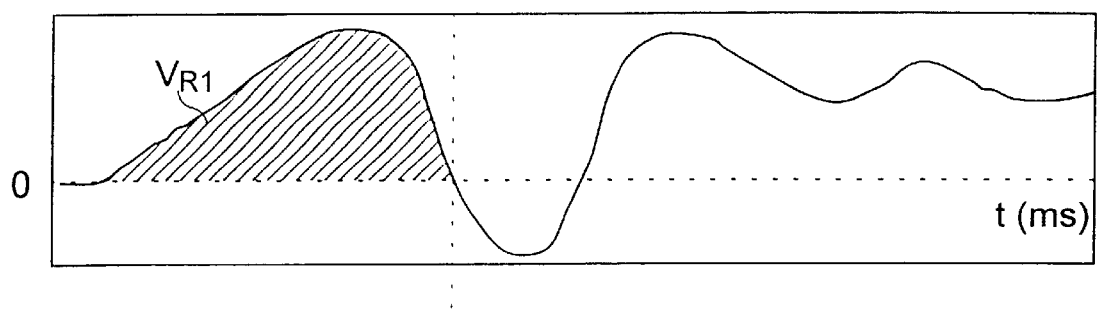
FIG. 7 is graphs to show states of changes in right front G and left front G in the case of an offset crash in the first embodiment.
Figure 7:
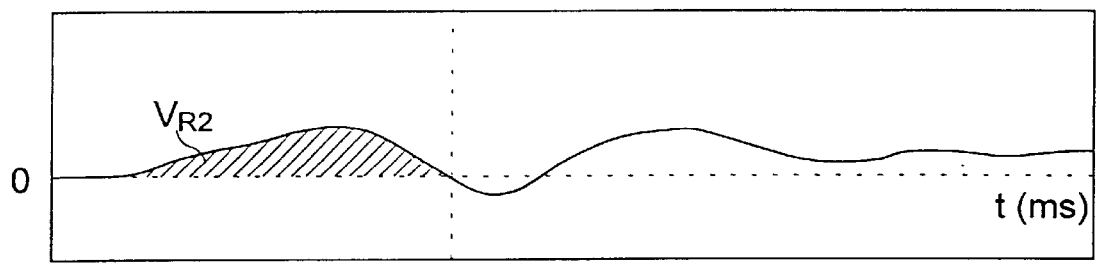

FIG. 7 is the graphs to show states of changes in left front G and right front G appearing when an offset crash occurs in the left front part of the vehicle 46 during running at a middle speed. As seen from these graphs, the left front G and right front G start rising at approximately identical timing, but the difference is large enough between the maximums to satisfy the condition of rR=$V_{R1}/V_{R2}$>>1. Therefore, the collision is identified as an offset crash.

Next, after identifying the type of collision as an offset crash, the collision type identifying part 42 determines whether the offset crash is an ORB crash (an irregular collision against a hard obstacle) or an ODB crash (an irregular collision against a soft obstacle) (step S22). Namely, the identifying part 42 computes right front P and left front P from the right front G and left front G, based on Eq. 3, and identifies the type of collision as an ODB crash when the condition of (a peak value of collision-side front P)/(a peak value of non-collision-side front P)>threshold is met. The identifying part 42 identifies the collision as an ORB crash when this condition is not met.

$$P(t) = \int_T G'(t) dt \qquad [\text{Eq. 3}]$$

G(t): output of front sensor

Figure 8:
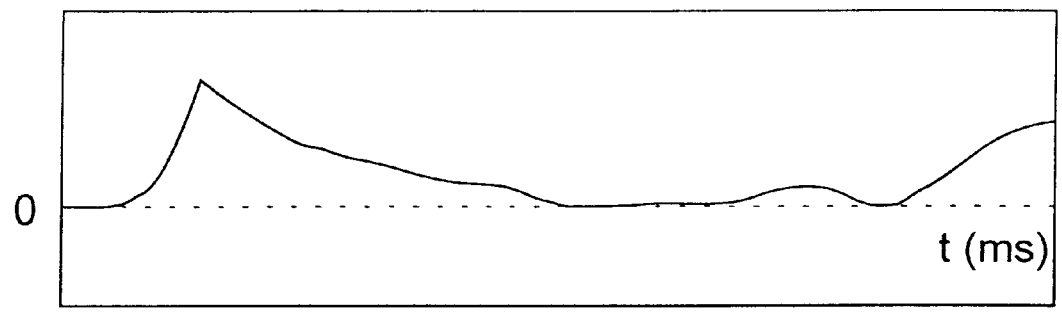
FIG. 8 is graphs to show states of changes in right front P and left front P in the case of a middle-speed ODB crash in the first embodiment.
Figure 8:
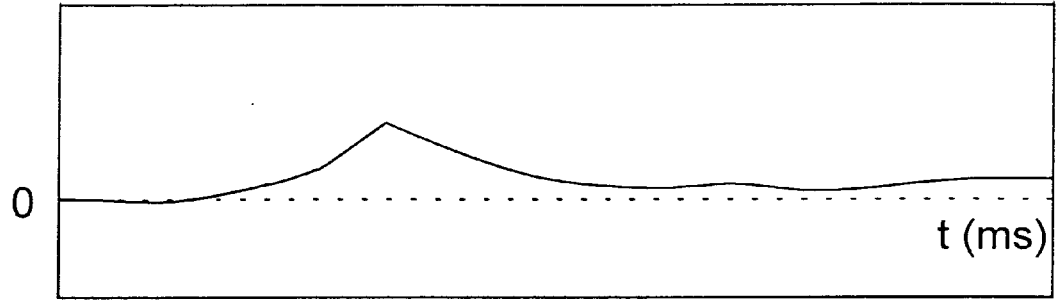

FIG. 8 is the graphs to show states of changes in the right front P and left front P appearing when an ODB crash occurs in the right front part of the vehicle 46 during running at a middle speed. In this case, as illustrated in the graphs, the difference is large between the first peak values of left front P and right front P and the condition of (the first peak value of collision-side front P)/(the first peak value of non-collision-side front P)>threshold is met. Therefore, the collision is identified as an ODB crash.

Figure 9:
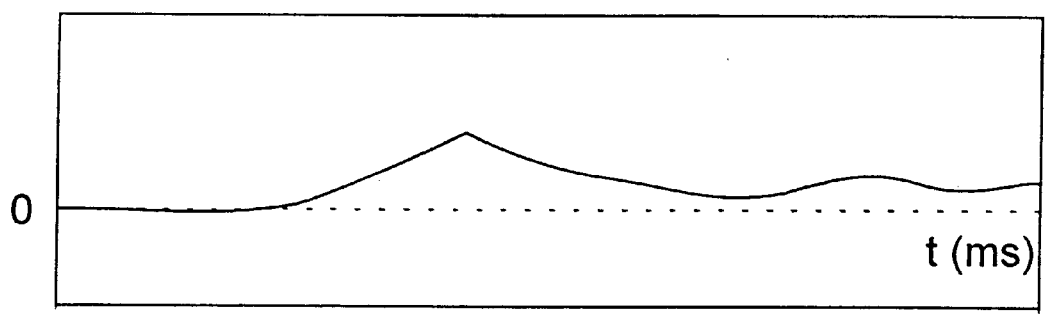
FIG. 9 is graphs to show states of changes in right front P and left front P in the case of a low-speed ORB crash in the first embodiment.
Figure 9:
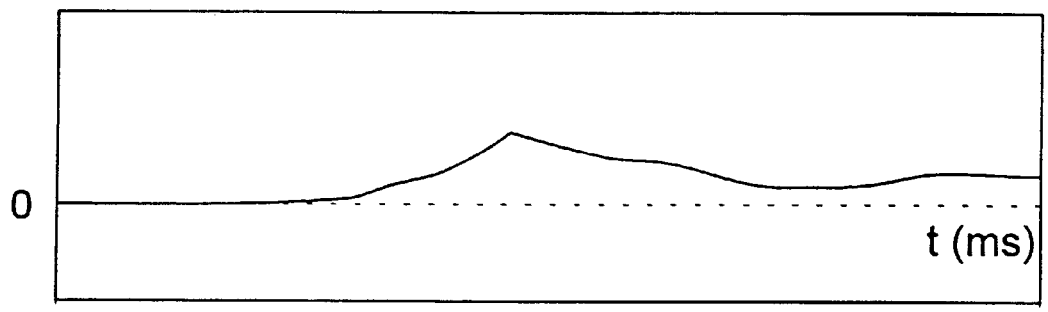

FIG. 9 is the graphs to show states of changes in the right front P and left front P appearing when an ORB crash occurs in the right front part of the vehicle 46 during running at a low speed. In this case, as illustrated in the graphs, the difference is small between the first peak values of left front P and right front P and the condition of (the peak value of collision-side front P)/(the peak value of non-collision-side front P)>threshold is not met. Therefore, the collision is identified as an ORB crash.

Next, after identifying the collision as a crash except for the offset crashes, the collision type identifying part 42 determines whether the type of collision is a pole/underride crash (step S23). Namely, P(t) is computed by Eq. 4 based on the deceleration signal G(t) of the floor sensor 32 in the event of a pole crash occurring in the vehicle 46, and whether the type of collision is a pole/underride crash is determined based on the waveform of G(t) before and after the first peak of P(t).

$$P(t) = \int_T G(t) dt \qquad [\text{Eq. 4}]$$

G(t): output of floor sensor

Figure 10:
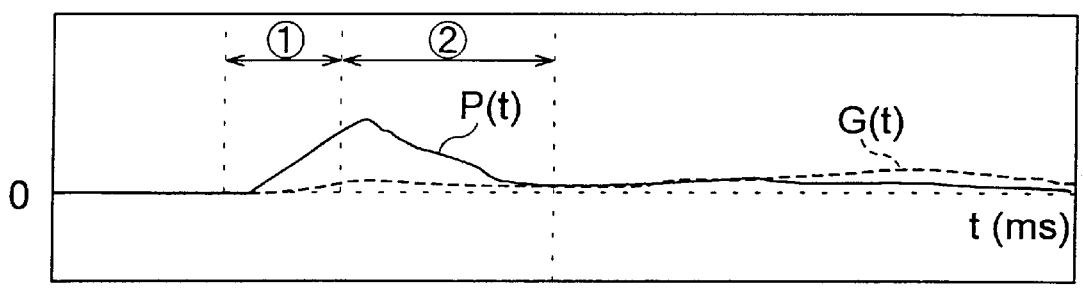
FIG. 10 is a graph to show states of changes in the deceleration and a factor based on the deceleration in the case of a soft crash in the first embodiment.

FIG. 10 is a graph to show the waveform of P(t) and the waveform of G(t) appearing when a pole crash occurs in the vehicle 46. As illustrated in this graph, when a time average G1 of G(t) in the zone ① (the zone up to a maximum of P(t)) is compared with a time average G2 of G(t) in the zone ② (the zone from the maximum to a minimum of P(t)), there is the relation of G1>G2. Therefore, the collision is identified as a pole crash.

Figure 11:
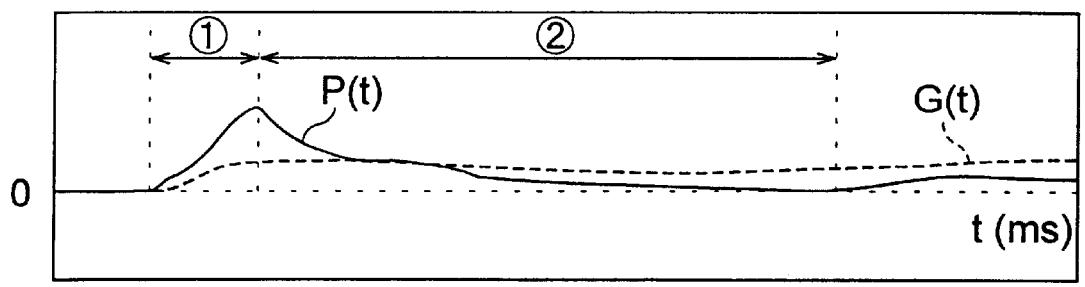
FIG. 11 is a graph to show states of changes in the deceleration and a factor based on the deceleration in the case of a frontal crash in the first embodiment.

FIG. 11 shows the waveform of P(t) and the waveform of G(t) appearing when a frontal crash occurs in the vehicle 46. As illustrated in this graph, when the time average G1 of G(t) in the zone ① (the zone up to a maximum of P(t)) is compared with the time average G2 of G(t) in the zone ② (the zone from the maximum to a minimum of P(t)), there is the relation of G1<G2. Therefore, the type of collision is identified as a frontal crash except for the pole/underride crash. Namely, the type of collision is identified as a frontal crash when it is neither of the oblique crash, the ORB crash, the ODB crash, and the pole/underride crash.

The activation determination part 60 compares a value defined by the operation results $v_{10}$, $V_n$ with either one of activation determination maps stored in the activation determination part 60. Namely, the activation determination part 60 stores an oblique crash map selected when the type of collision is identified as an oblique crash (step S24 of FIG. 5), a frontal crash (high) map selected when the type of collision is identified as a frontal crash except for the pole/underride crash (step S25 of FIG. 5), a pole/underride map selected when the type of collision is identified as a pole/underride crash (step S26 of FIG. 5), an ODB map selected when the type of collision is identified as an ODB crash (step S27 of FIG. 5), and an ORB map selected when the type of collision is identified as an ORB crash (step S28 of FIG. 5), and compares the value defined by the operation results $V_{10}$, $V_n$ with either one activation determination map selected according to the type of collision identified by the collision type identifying part 42.

Figure 12A:
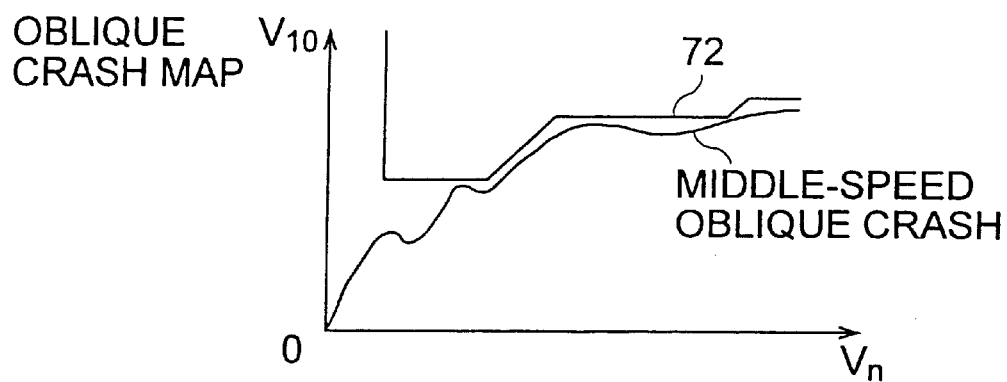
FIG. 12A is a diagram to show an activation determination map (an oblique crash map) used in the activation control apparatus of the airbag system according to the first embodiment.
Figure 12B:
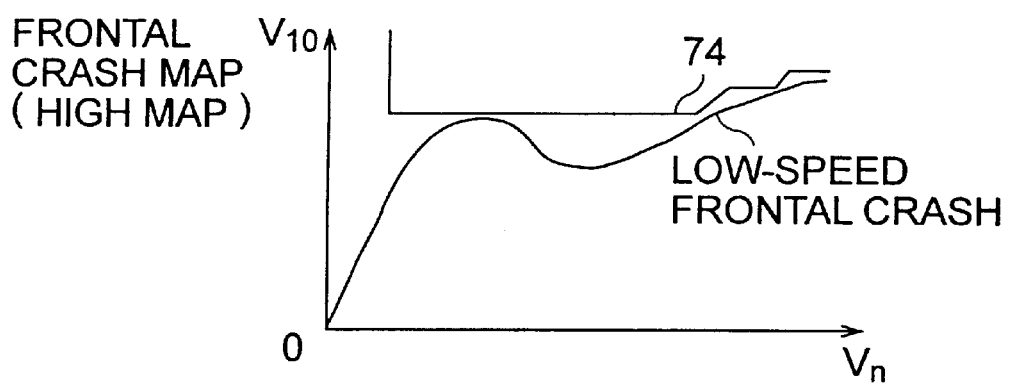
FIG. 12B is a diagram to show an activation determination map (a frontal crash map) used in the activation control apparatus of the airbag system according to the first embodiment.

In the oblique crash map (see FIG. 12A) a threshold 72 is set so as not to activate the airbag system 36 even in the event of a middle-speed oblique crash of the vehicle 46. In the frontal crash (high) map (see FIG. 12B) a threshold 74 is set so as not to activate the airbag system 36 even in the event of a low-speed frontal crash occurring in the vehicle 46.

Figure 13A:
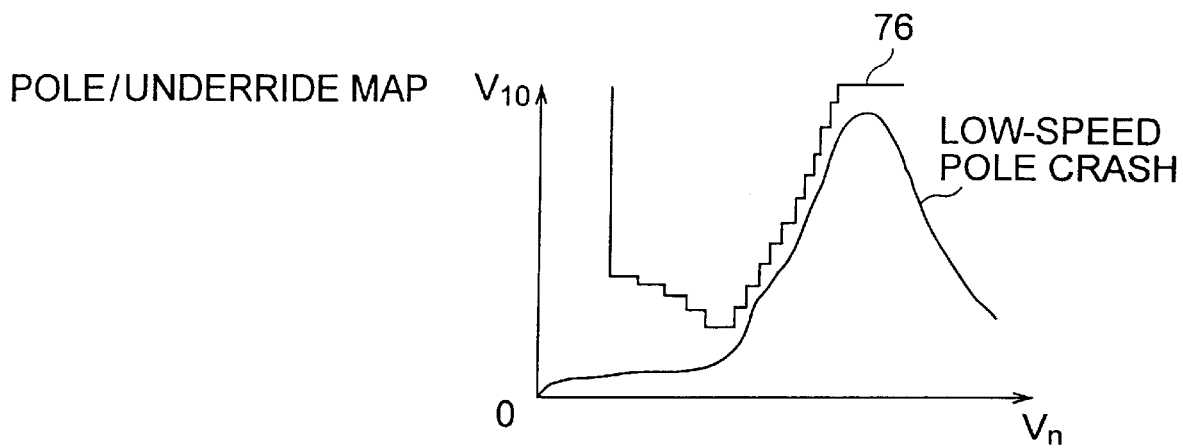
FIG. 13A is a diagram to show an activation determination map (a pole/underride map) used in the activation control apparatus of the airbag system according to the first embodiment.
Figure 13B:
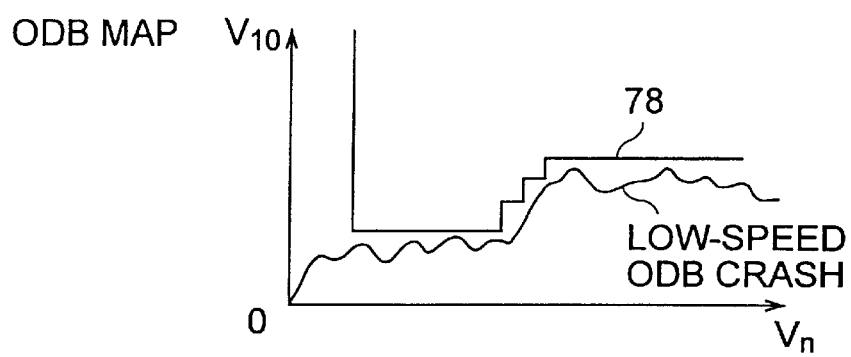
FIG. 13B is a diagram to show an activation determination map (an ODB map) used in the activation control apparatus of the airbag system according to the first embodiment.
Figure 13C:
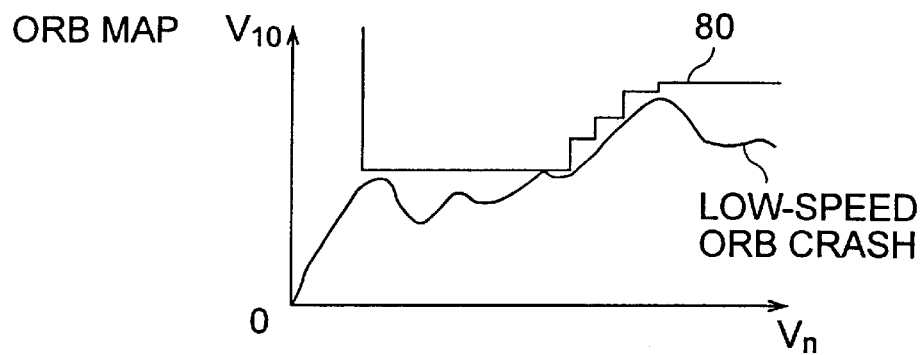
FIG. 13C is a diagram to show an activation determination map (an ORB map) used in the activation control apparatus of the airbag system according to the first embodiment.

In the pole/underride map (see FIG. 13A) a threshold 76 is set so as not to activate the airbag system 36 even in the event of a low-speed pole crash occurring in the vehicle 46. In the ODB map (see FIG. 13B) a threshold 78 is set so as not to activate the airbag system 36 even in the event of a low-speed ODB crash occurring in the vehicle 46. In the ORB map (see FIG. 13C) a threshold 80 is set so as not to activate the airbag system 36 even in the event of a low-speed ORB crash occurring in the vehicle 46. Each of these determination maps is a plot of the operation result $V_n$ on the axis of abscissas and the operation result $V_{10}$ on the axis of ordinates.

Therefore, the activation determination part 60 compares the value defined by the operation results $V_{10}$, $V_n$ computed in the operation part 58, with either one of the activation determination maps (step S13 of FIG. 4). When the value defined by the operation results $V_{10}$, $V_n$ is over the threshold, the activation determination part 60 outputs the activation signal A to the driving circuit 34 (see FIG. 1) (step S14 of FIG. 4). The driving circuit 34 energizes the squib 38 to fire the gas generator (not illustrated) by the squib 38.

Since the activation control apparatus of the occupant safety system according to the first embodiment is constructed to determine the type of collision, based on the values detected by the front sensors 30A, 30B, it can determine the type of collision in the early stage and with accuracy and can activate the airbag system 36 accurately according to the type of collision.

Figure 14:
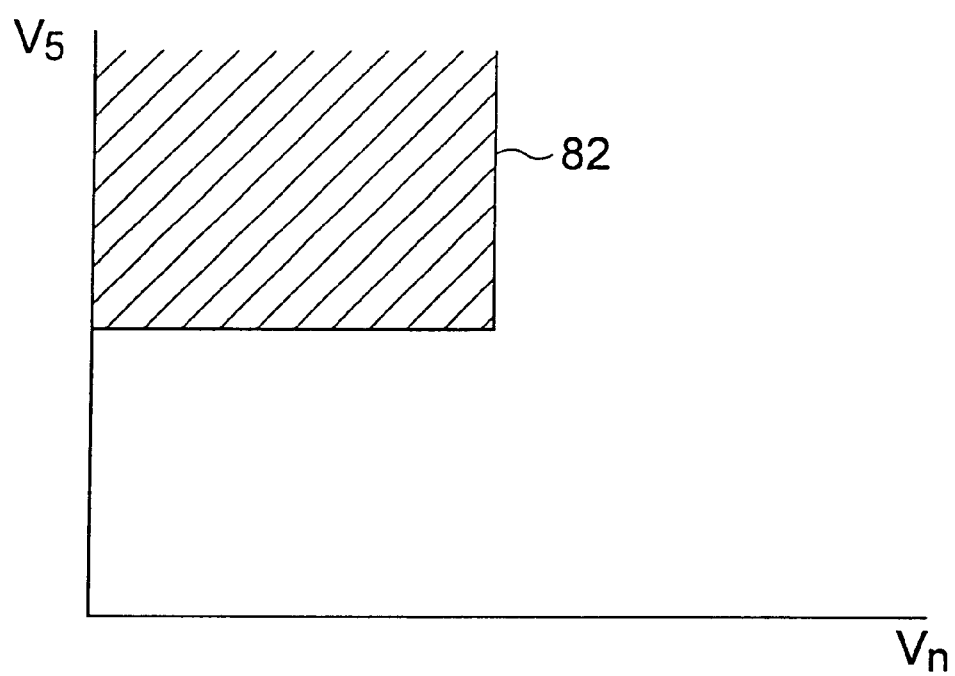
FIG. 14 is a diagram to show a map for determining severity of collision, used in the activation control apparatus of the airbag system according to the first embodiment.

The first embodiment described above may also be arranged further so as to determine the severity of impact and vary the output of the inflator of the airbag system. Specifically, the airbag system is provided with two inflators and the airbag system is activated by one inflator (low output) or by two inflators (high output) according to the severity of collision. In this case, the severity of collision is judged depending upon whether a value defined by $V_n$ computed according to Eq. 2 and $V_5$ computed according to Eq. 5 is over a threshold 82 of the map illustrated in FIG. 14. When the value is over the threshold 82, it is determined that the collision is severe and the airbag system is activated at the high output of the inflators. When the value is not over the threshold 82, it is determined that the collision is not severe and the airbag system is activated at the low output of the inflator. Here $V_5$ is an interval integral of the deceleration G'(t) detected by the front sensor every interval of 5 ms in the period from occurrence of collision to the end of collision.

$$V_5 = \int_{t-10\,ms}^{t} G'(t)dt \quad [\text{Eq. 5}]$$

G'(t): output of front sensor

Therefore, the airbag system can be activated accurately according to the type of collision and the airbag system can also be activated at an appropriate output according to the severity of collision.

In the first embodiment described above the apparatus is provided with the two front sensors 30A, 30B, but the apparatus may also provided with three front sensors, without having to be limited to two. In this case, when the third front sensor is mounted in the central part of the vehicle, the pole crash can be detected accurately.

In the first embodiment described above the two front sensors 30A, 30B are mounted on the right front side member and on the left front side member, but they may also be located at appropriate positions ahead of the floor sensor in the vehicle; for example, near the left and right ends of the bumper in the front part of the vehicle, near the front portions of the left and right front side members, near the left and right ends of the dash panel, and so on.

Next, the activation control apparatus of the occupant safety system according to the second embodiment of the present invention will be described. The activation control apparatus of the airbag system according to the second embodiment has the same structure as the activation control apparatus 2 of the airbag system according to the first embodiment (see FIG. 1 to FIG. 3).

Figure 15:
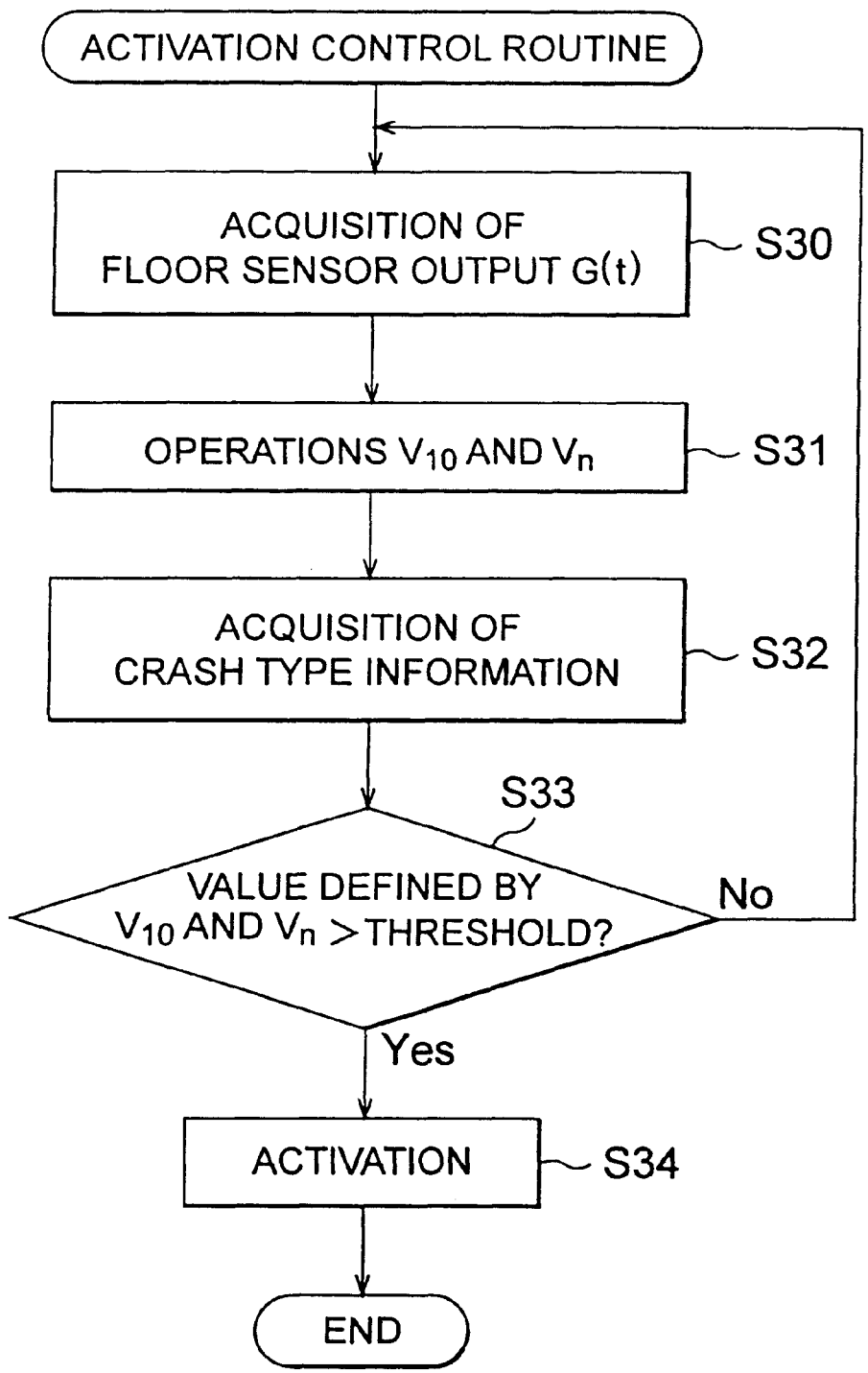
FIG. 15 is a flowchart to show an activation control process in the activation control apparatus of the airbag system according to the second embodiment.

FIG. 15 is a flowchart for explaining the control of activation of the airbag system. When the operation part 58 of the activation control 40 acquires the deceleration G(t) outputted from the floor sensor 32 (step S30), it executes the predetermined operations with the deceleration G(t), i.e., the operations according to Eq. 1 and Eq. 2 to obtain the operation results $V_{10}$, $V_n$ (step S31).

Next, the activation determination part 60 acquires information concerning the type of collision from the collision type identifying part 42 (step S32) and compares the value defined by the operation results $V_{10}$, $V_n$ with either one of the activation determination maps stored in the activation determination part 60 (step S33).

Figure 18:
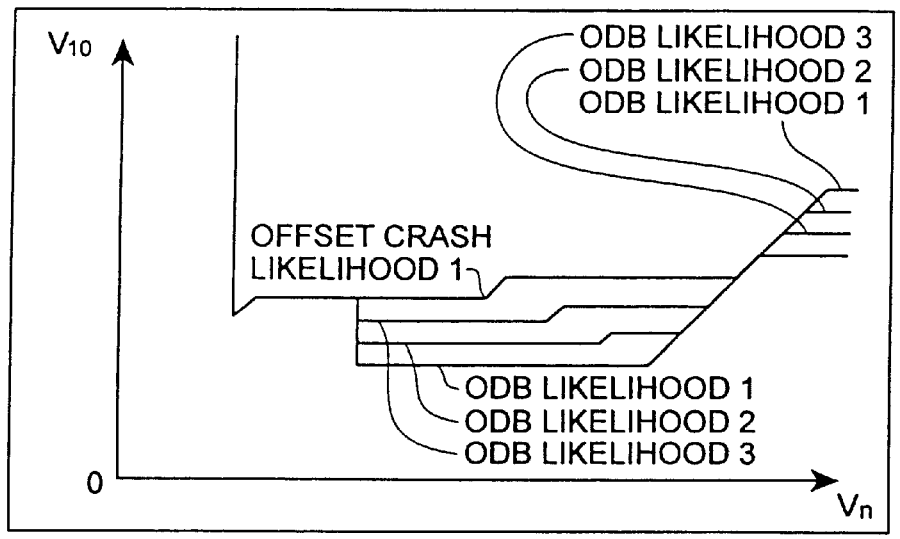
FIG. 18 is a diagram to show an activation determination map used in the activation control apparatus of the airbag system according to the second embodiment.
Figure 19:
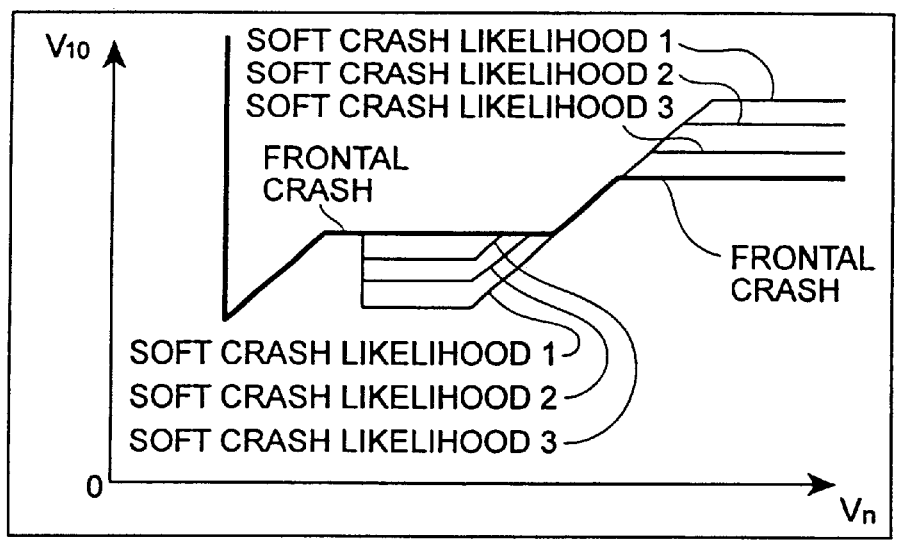
FIG. 19 is a diagram to show an activation determination map used in the activation control apparatus of the airbag system according to the second embodiment.

Namely, the activation determination part 60 stores a frontal crash/oblique crash map (FIG. 16), a frontal crash/offset crash map (FIG. 17), an offset crash/ODB crash map (FIG. 18), and a frontal crash/soft crash map (FIG. 19) as the activation determination maps and compares the value defined by the operation results with either map selected according to the information concerning the type of collision acquired from the collision type identifying part 42. Here the soft crash means a type of collision in which the impact exerted on the vehicle in the late stage of collision is greater than that in the initial stage of collision, in which in the initial stage of collision the left and right side members are relatively unaffected by the impact due to the collision while the impact is absorbed by deformation of the front part of the vehicle, and in which in the late stage of collision the crash reaches the rigid body including the engine etc. while the impact on the vehicle becomes great.

The frontal crash map is selected before execution of the determination of the collision type by the collision type identifying part 42, i.e., immediately after the occurrence of collision, and the value defined by the operation results $V_{10}$, $V_n$ is compared with this frontal crash map.

Therefore, the activation determination part 60 compares the value defined by the operation results $V_{10}$, $V_n$ computed in the operation part 58, with either of the activation determination maps and outputs the activation signal A to the driving circuit 34 (see FIG. 1) when the value defined by the operation results $V_{10}$, $V_n$ is over the threshold (step S34). This causes the driving circuit 34 to energize the squib 38, whereupon the gas generator (not illustrated) is fired by the squib 38.

Figure 20:
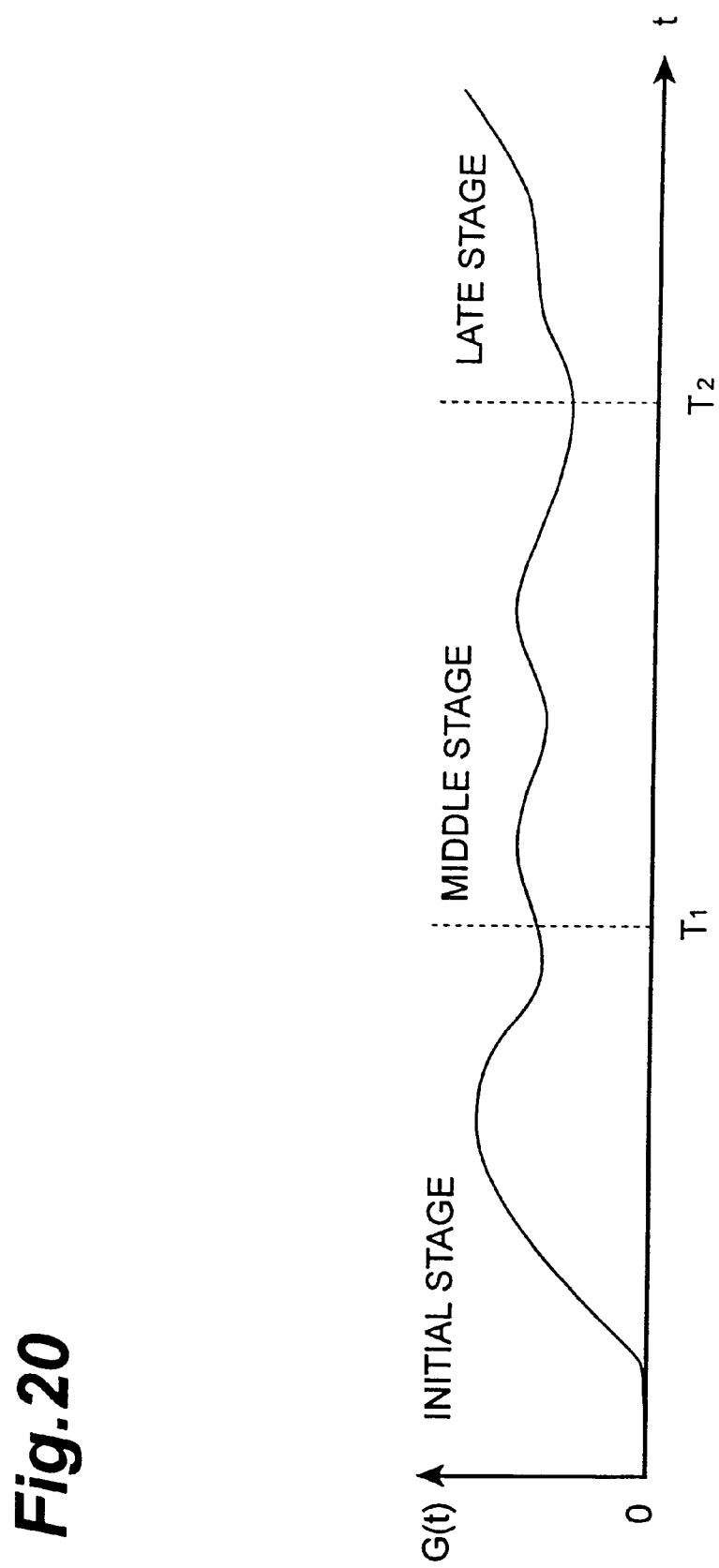
FIG. 20 is a diagram to show determination procedures of crash type carried out in the activation control apparatus of the airbag system according to the second embodiment.

In the collision type identifying part 42 the Kalman filter shapes the deceleration signal G'(t) outputted from each front sensor 30A, 30B and the type of collision is identified based on the deceleration signals thus shaped and the deceleration signal G(t) outputted from the floor sensor (impact detecting means) 32. This identification of the collision type is carried out in two stages of an initial stage and a middle stage of collision. Namely, FIG. 20 shows a graph of the waveform of the deceleration signal G(t) outputted from the floor sensor 32. In this graph the period from 0 to $T_1$ is defined as an initial stage of collision and the period from $T_1$ to $T_2$ as a middle stage of collision.

Figure 21:
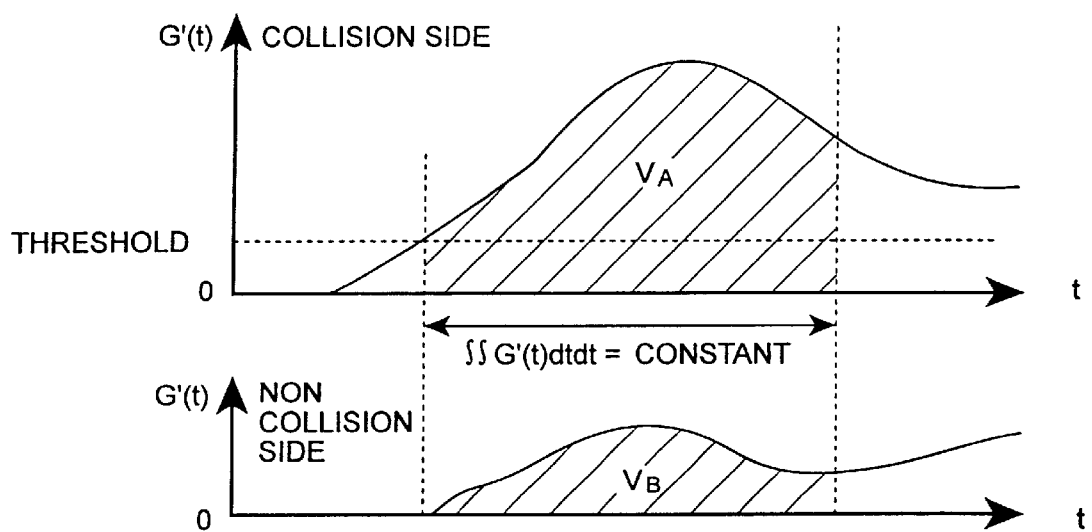
FIG. 21 is graphs to show output waveforms of the front sensors used in the determination of crash type in the activation control apparatus of the airbag system according to the second embodiment.

First, in the initial stage of collision the collision of the vehicle is classified under the frontal crash, the offset crash, and the oblique crash, based on a ratio of the left and right deceleration signals G'(t) outputted from the front sensors 30A, 30B. Namely, as illustrated in FIG. 21, the operation according to Eq. 6 is started with the deceleration signals G'(t) outputted from the respective front sensors 30A, 30B when the deceleration signal G'(t) outputted from the collision-side front sensor out of those G'(t) outputted from the front sensors 30A, 30B becomes over a threshold. This operation is terminated when the operation result $V_A$ based on the deceleration signal G'(t) outputted from the collision-side front sensor reaches a constant (a value set for each vehicle).

$$V=\int\int G'(t)dtdt \qquad [\text{Eq. 6}]$$

G'(t): output of front sensor

Figure 22:
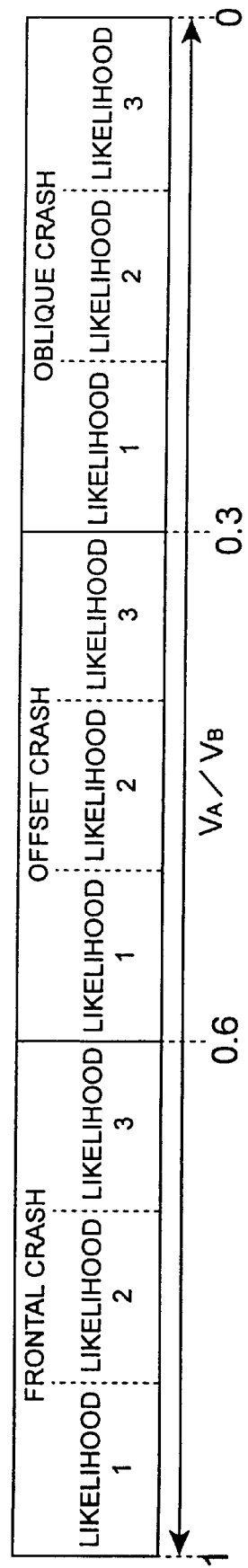
FIG. 22 is a diagram for explaining the determination of crash type carried out in the activation control apparatus of the airbag system according to the second embodiment.

Next, the identifying part 42 calculates a ratio of the operation result $V_A$ based on the deceleration signal G'(t) outputted from the collision-side front sensor to the operation value $V_B$ based on the deceleration signal G'(t) outputted from the non-collision-side front sensor, i.e., $V_A/V_B$ and classifies the collision under the frontal crash, the offset crash, and the oblique crash, based on the value of $V_A/V_B$. Namely, as illustrated in FIG. 22, when the value of $V_A/V_B$ is 0 to 0.3, the collision is classified into either of likelihood 1, likelihood 2, and likelihood 3 of the oblique crash, based on the value of $V_A/V_B$. When the value of $V_A/V_B$ is 0.3 to 0.6, the collision is classified into either of likelihood 1, likelihood 2, and likelihood 3 of the offset crash, based on the value of $V_A/V_B$. Further, when the value of $V_A/V_B$ is 0.6 to 1.0, the collision is classified into either of likelihood 1, likelihood 2, and likelihood 3 of the frontal crash, based on the value of $V_A/V_B$.

The term "likelihood" herein is certainty; the likelihood 1 of the oblique crash means the highest certainty of the collision being the oblique crash, while the likelihood 3 of the oblique crash means the lowest certainty of the collision being the oblique crash. Similarly, the likelihood 1 of the frontal crash means the highest certainty of the collision being the frontal crash, while the likelihood 3 of the frontal crash means the lowest certainty of the collision being the frontal crash. In contrast with it, the likelihood 1 of the offset crash represents an ambiguous situation also including the possibility of the collision being the oblique crash, while the likelihood 3 of the offset crash represents an ambiguous situation also including the possibility of the collision being the frontal crash.

When the collision is classified into either one of likelihood 1, likelihood 2, and likelihood 3 of the oblique crash, the collision type identifying part 42 outputs either of likelihood 1, likelihood 2, and likelihood 3 of the oblique crash as collision information to the activation determination part 60. In this case, therefore, the activation determination part 60 selects either one of an oblique crash likelihood 1 map, an oblique crash likelihood 2 map, and an oblique crash likelihood 3 map corresponding to the collision information (see FIG. 16). When the collision is classified into either one of likelihood 1, likelihood 2, and likelihood 3 of the offset crash, the collision type identifying part 42 outputs either of likelihood 1, likelihood 2, and likelihood 3 of the offset crash as collision information to the activation determination part 60. In this case, therefore, the activation determination part 60 selects either one of an offset likelihood 1 map, an offset likelihood 2 map, and an offset likelihood 3 map corresponding to the collision information (see FIG. 17).

Figure 16:
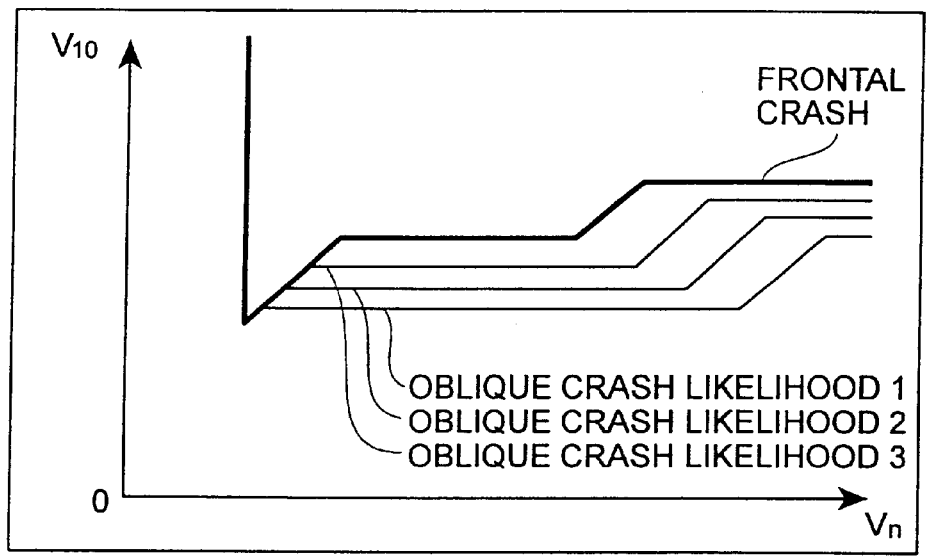
FIG. 16 is a diagram to show an activation determination map used in the activation control apparatus of the airbag system according to the second embodiment.
Figure 17:
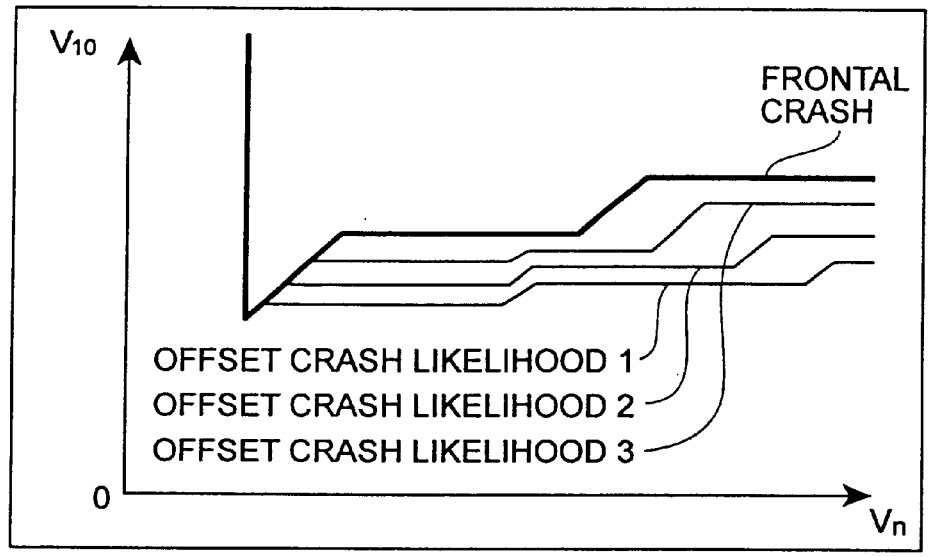
FIG. 17 is a diagram to show an activation determination map used in the activation control apparatus of the airbag system according to the second embodiment.

On the other hand, when the collision is classified into either one of likelihood 1, likelihood 2, and likelihood 3 of the frontal crash, the collision type identifying part 42 outputs no collision information to the activation determination part 60 and then the activation determination part 60 selects the frontal crash map as an activation determination map (see FIG. 16 and FIG. 17).

In the initial stage of collision, when the above classification of the collision type results in classifying the collision into either of likelihood 1, likelihood 2, and likelihood 3 of the offset crash, and likelihood 3 of the frontal crash, the identifying part determines whether the collision of the vehicle is the ORB crash (the irregular collision against the hard obstacle) or the ODB crash (the irregular collision against the soft obstacle), based on the initial deviation between the deceleration signals G'(t) outputted from the front sensors 30A, 30B.

Figure 23:
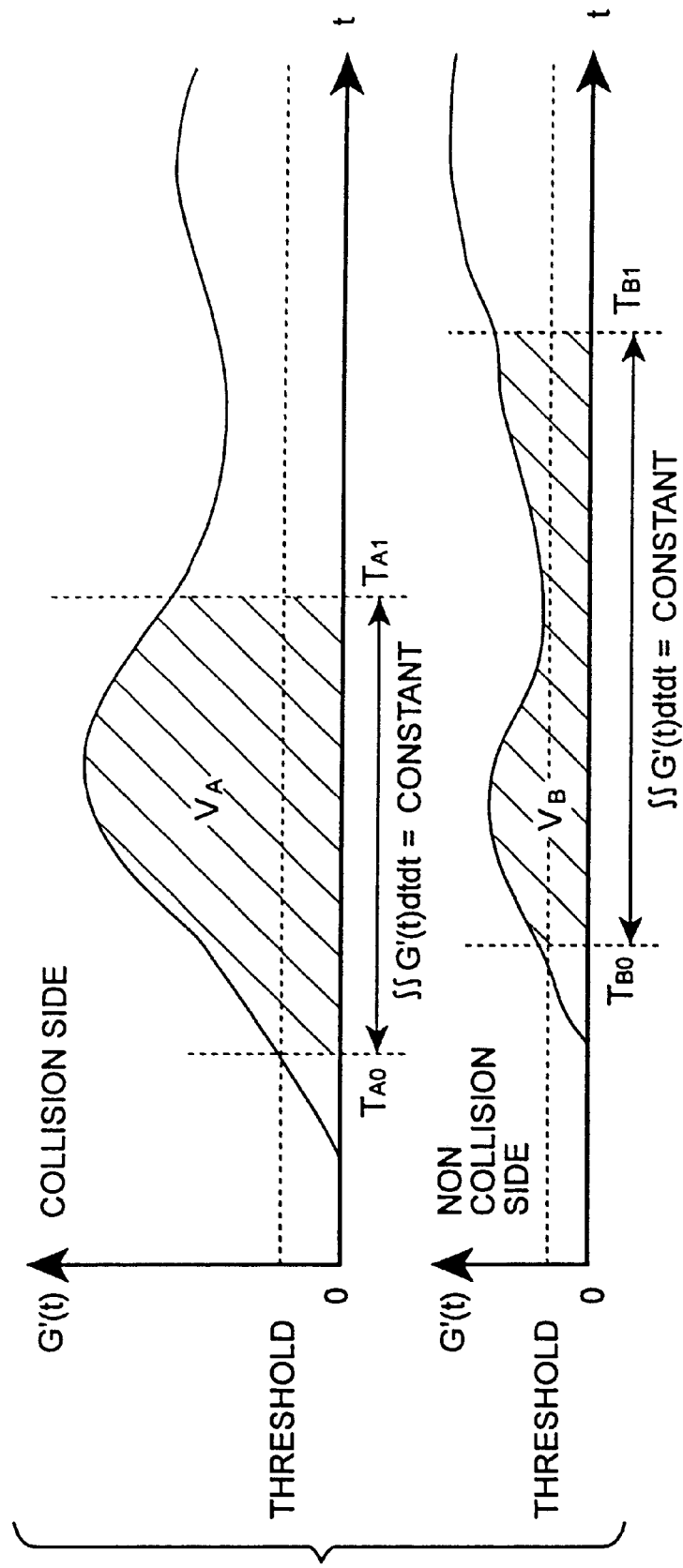
FIG. 23 is graphs to show output waveforms of the front sensors used in the determination of crash type in the activation control apparatus of the airbag system according to the second embodiment.
Figure 24:
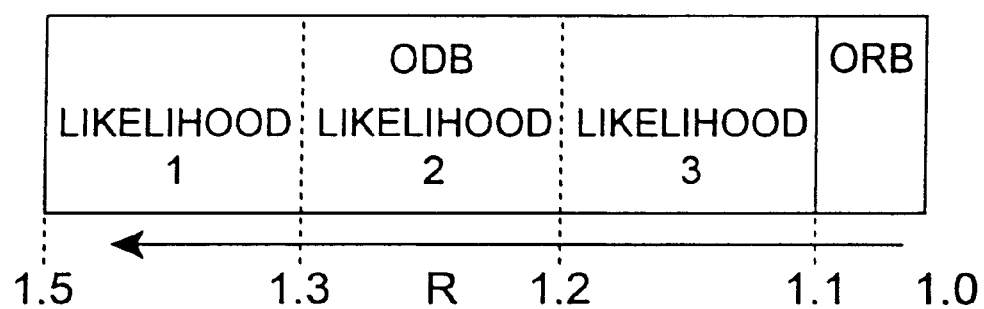
FIG. 24 is a diagram for explaining the determination of crash type carried out in the activation control apparatus of the airbag system according to the second embodiment.

Namely, as illustrated in FIG. 23, the operation according to Eq. 6 is started with the collision-side deceleration signal G'(t) when the deceleration signal G'(t) outputted from the collision-side front sensor out of those G'(t) outputted from the front sensors 30A, 30B becomes over the threshold. The operation according to Eq. 6 is also started with the non-collision-side deceleration signal G'(t) when the deceleration signal G'(t) outputted from the non-collision-side front sensor out of those G'(t) outputted from the front sensors 30A, 30B becomes over the threshold.

The operation based on the deceleration signal G'(t) outputted from the collision-side front sensor is terminated when the operation result $V_A$ reaches a constant (a value set for each vehicle). The operation based on the deceleration signal G'(t) outputted from the non-collision-side front sensor is terminated when the operation result $V_B$ reaches the constant (the value set for each vehicle).

Next, average accelerations $G_{Aa}$, $G_{Ba}$ are computed according to Eq. 7, based on the operation result $V_A$ and the operation result $V_B$, and an operation value R is computed according to Eq. 8.

$$G_{Aa}=V_A/(T_{A1}-T_{A0})$$

$$G_{Ba}=V_B/(T_{B1}-T_{B0}) \qquad [\text{Eq. 7}]$$

$$R=(V_A/V_B)/(G_{Aa}/G_{Ba}) \qquad [\text{Eq. 8}]$$

Then the collision is classified under the ORB crash and the ODB crash, based on the value of the operation result R. Namely, when the value of the operation result R is 1 to 1.1, the collision is classified as an ORB crash. When the value of the operation result R is 1.1 to 1.5, the collision is classified into either of likelihood 1, likelihood 2, and likelihood 3 of the ODB crash, based on the value of the operation result R. Namely, the greater the initial deviation between the collision-side operation result $V_A$ and the non-collision-side operation result $V_B$, the higher the probability of the ODB crash to be classified into.

Here "likelihood 1 of the ODB crash" means the highest certainty of the collision being the ODB crash, while "likelihood 3 of the ODB crash" means the lowest certainty of the collision being the ODB crash. Since the classification herein is provisional classification, the collision type identifying part 42 outputs no collision information to the activation determination part 60 even if the collision is classified here into either of likelihood 1, likelihood 2, and likelihood 3 of the ODB crash. In this case, therefore, the frontal crash map, the offset crash map, or the oblique crash map is used as an activation determination map.

Next, in the middle stage of collision (see FIG. 20) the collision of the vehicle is classified into either of likelihood 1, likelihood 2, and likelihood 3 of the ODB crash, based on the difference between the left and right deceleration signals G'(t) outputted from the front sensors 30A, 30B, thereby determining the type of collision. The classification here into likelihood 1, likelihood 2, or likelihood 3 of the ODB crash is carried out only when the collision was classified into either likelihood 1, likelihood 2, or likelihood 3 of the ODB crash in the initial stage of collision, and it is not carried out when the collision is classified as an ORB crash.

Figure 25:
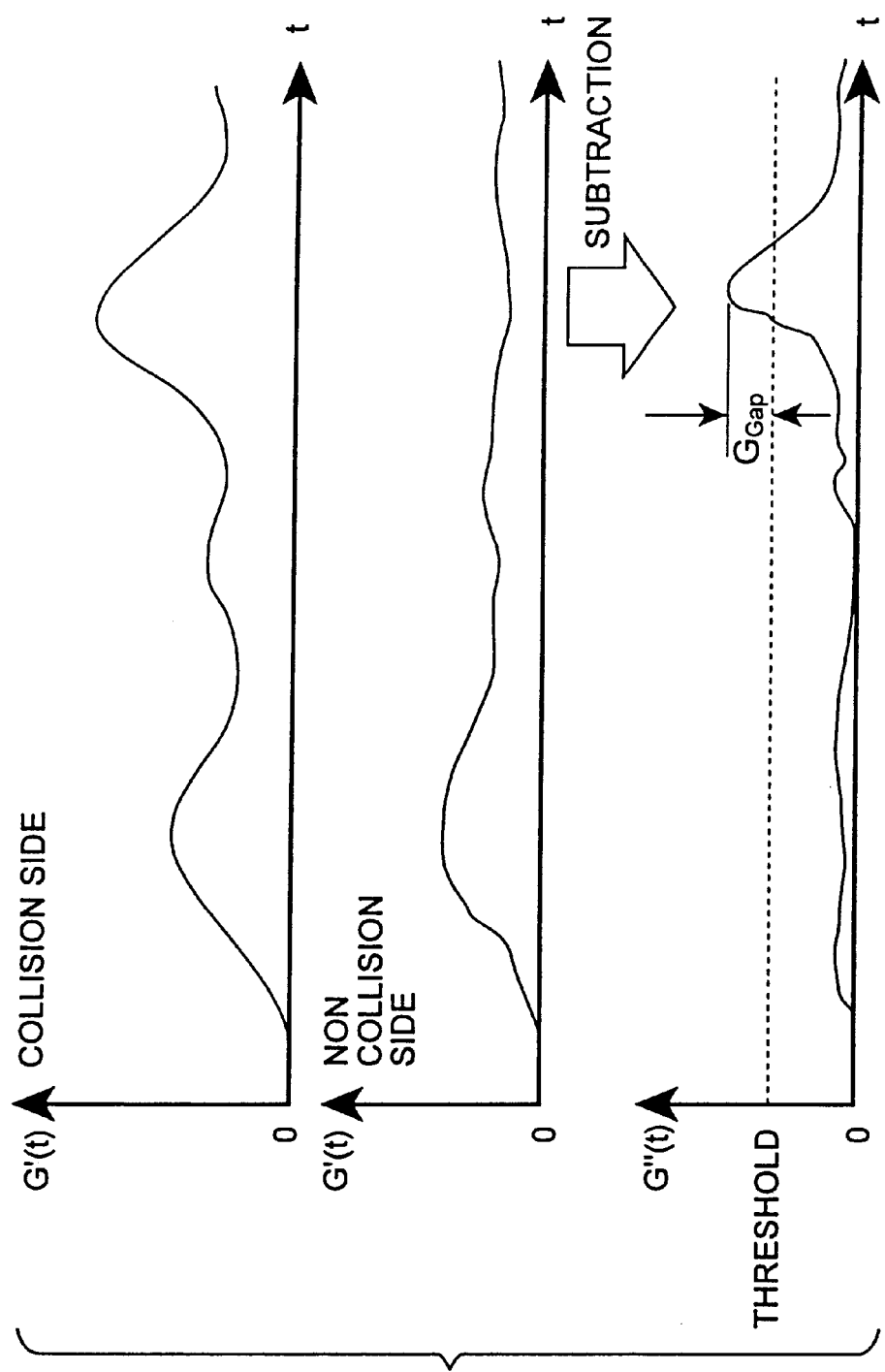
FIG. 25 is graphs to show output waveforms of the front sensors used in the determination of crash type in the activation control apparatus of the airbag system according to the second embodiment.

Namely, as illustrated in FIG. 25, the difference is calculated between the deceleration signals G'(t) outputted from the front sensors 30A, 30B, i.e., between the deceleration signal G'(t) outputted from the collision-side front sensor and the deceleration signal G'(t) outputted from the non-collision-side front sensor, and a value $G_{Gap}$ is defined as an excess of this difference G"(t) over a threshold.

Figure 26:
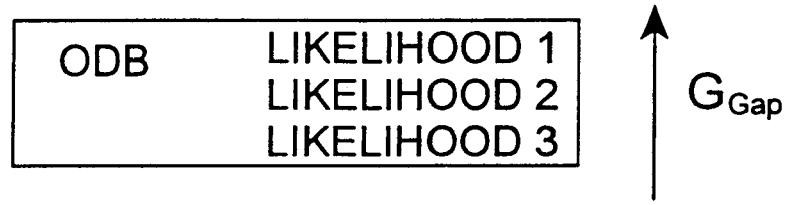
FIG. 26 is a diagram for explaining the determination of crash type carried out in the activation control apparatus of the airbag system according to the second embodiment.

Then the collision is classified into either of likelihood 1, likelihood 2, and likelihood 3 of the ODB crash, based on the value of $G_{Gap}$ (see FIG. 26). When the collision is classified here into either of likelihood 1, likelihood 2, and likelihood 3 of the ODB crash, the collision type identifying part 42 outputs either of likelihood 1, likelihood 2, and likelihood 3 of the ODB crash as collision information to the activation determination part 60. In this case, therefore, the activation determination part 60 selects either one of an ODB likelihood 1 map, an ODB likelihood 2 map, and an ODB likelihood 3 map corresponding to the collision information (see FIG. 18).

In the middle stage of collision, whether the collision of the vehicle is a soft crash is determined based on the deceleration signal G(t) outputted from the floor sensor 32. The determination of whether a soft crash or not is carried out only when the collision of the vehicle was classified into either likelihood 1, likelihood 2, or likelihood 3 of the frontal crash, or likelihood 3 of the offset crash in the initial stage of collision.

Figure 27:
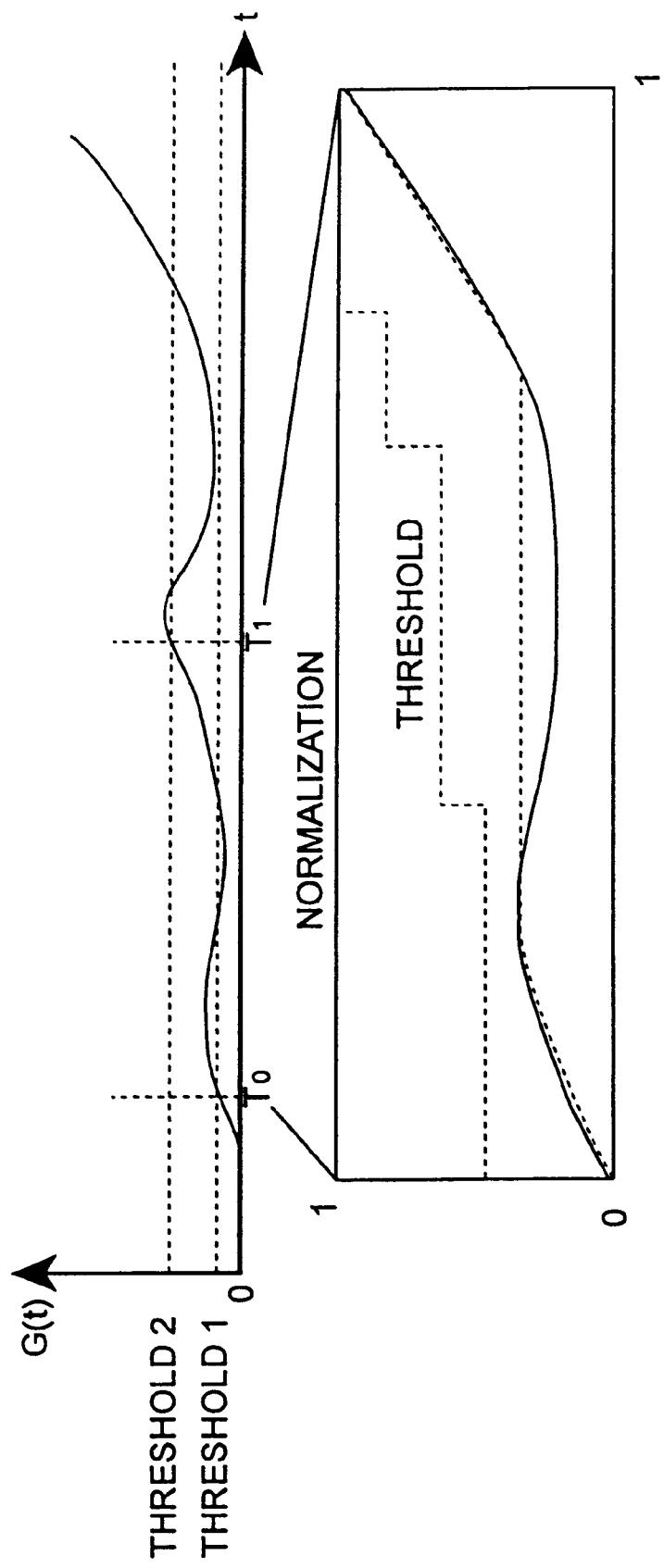
FIG. 27 is a graph to show an output waveform of the front sensor used in the determination of crash type in the activation control apparatus of the airbag system according to the second embodiment.

Namely, as illustrated in FIG. 27, letting $T_0$ be a time when the deceleration signal G(t) outputted from the floor sensor 32 exceeds a threshold 1 and letting $T_1$ be a time when the deceleration signal G(t) exceeds a threshold 2, the range between $T_0$ and $T_1$ is expanded onto a normalized GT plane having the axis of abscissas (0 to 1) and the axis of ordinates (0 to 1). When the deceleration signal G(t) or a peak hold waveform $G(t)_{PH}$ of the deceleration signal G(t) is over a threshold set in the normalized GT plane, the identifying part does not carry out the determination of certainty or likelihood of the soft crash as to the collision of the vehicle. On the other hand, when the deceleration signal G(t) and the peak hold waveform $G(t)_{PH}$ of the deceleration signal G(t) are not over the threshold set in the normalized GT plane, the identifying part carries out the determination of likelihood of the soft crash as to the collision of the vehicle.

Namely, the identifying part computes $V_A$ and $V_B$ according to Eq. 9 and also computes an unevenness ratio r according to Eq. 10.

$$V_A \int G(t)dt \qquad [\text{Eq. 9}]$$

G(t): output of floor sensor $$V_B = \int G(t)_{PH} dt$$

$G(t)_{PH}$: peak hold value of floor sensor output $$\text{unevenness ratio } r = V_A/V_B \qquad [\text{Eq. 10}]$$

Figure 28:
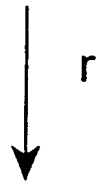
FIG. 28 is a diagram for explaining the determination of crash type carried out in the activation control apparatus of the airbag system according to the second embodiment.

Then, based on this unevenness ratio r, the identifying part determines the likelihood of how the collision of the vehicle is likely to be the soft crash. Namely, when the certainty of the collision of vehicle being the soft crash is strong, the collision is classified into likelihood 1, because the unevenness ratio r is small (or unevenness is large). When the certainty of the collision of the vehicle being the soft crash is small, the collision is classified into likelihood 3, because the unevenness ratio r is large (or unevenness is small) (see FIG. 28).

When the collision is classified here into either of likelihood 1, likelihood 2, and likelihood 3 of the soft crash, the collision type identifying part 42 outputs either of likelihood 1, likelihood 2, and likelihood 3 of the soft crash as collision information to the activation determination part 60. In this case, therefore, the activation determination part 60 selects either one of a soft crash likelihood 1 map, a soft crash likelihood 2 map, and a soft crash likelihood 3 map corresponding to the collision information (see FIG. 19).

In the late stage of collision (see FIG. 20), when the type of collision is in an intermediate range, an activation determination map is selected with reference to the table illustrated in FIG. 29. For example, in the case wherein the likelihood of the front crash is 1 and the likelihood of the soft crash is 1, the soft crash map 1 is selected. In the case wherein the likelihood of the frontal crash is 2 and the likelihood of the soft crash is 2, the soft crash map 2 is selected. In the case wherein the likelihood of the frontal crash is 3, the likelihood of the soft crash is 3, and the likelihood of the ODB crash is 1, the ODB crash map 2 is selected.

Therefore, the activation determination part 60 compares the value defined by the operation results $V_{10}$, $V_n$ computed by the operation part 58, with the activation determination map selected at each point. When the value defined by the operation results $V_{10}$, $V_n$ is over the threshold of the activation determination map selected at each point, the activation determination part 60 outputs the activation signal A to the driving circuit 34 (see FIG. 1).

Since the activation control apparatus of the occupant safety system according to the second embodiment is constructed to obtain the likelihood of each collision type, select an activation determination map based on the likelihood, and determine the activation of the occupant safety system, the apparatus can determine the type of collision with accuracy and can activate the airbag system 36 accurately according to the type of collision.

Figure 30:
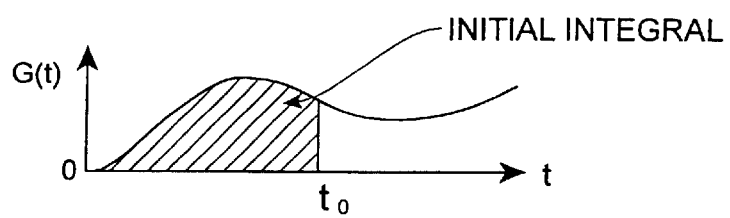
FIG. 30 is a diagram for explaining the determination of severity of impact carried out in the activation control apparatus of the airbag system according to the second embodiment.
Figure 31:
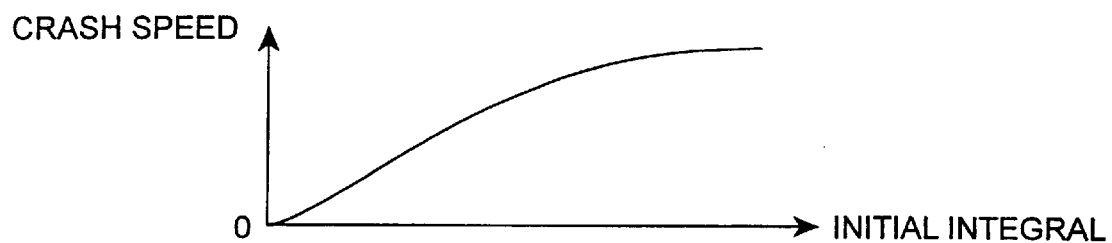
FIG. 31 is a diagram for explaining the determination of severity of impact carried out in the activation control apparatus of the airbag system according to the second embodiment.

In the second embodiment the apparatus may also be arranged further so as to determine the severity of impact and vary the output of the inflator of the airbag system according thereto. Namely, the airbag system is provided with two inflators and the airbag system is activated by one inflator (low output) or by two inflators (high output), depending upon the severity of collision. In this case, the severity of collision is determined as follows; as illustrated in FIG. 30, an initial integral (from the start of collision to $t_0$) of the measurement G(t) of the floor sensor 32 is computed and a colliding speed is estimated from this initial integral with reference to the graph illustrated in FIG. 31. This colliding speed estimated can be regarded as severity of impact (crash severity). When the colliding speed is over a threshold defined for each collision type, the airbag system is activated at the high output of the inflators, assuming that the collision is severe. When the colliding speed is not over the threshold, the airbag system is activated at the low output of the inflator, assuming that the collision is not severe.

Figure 32:
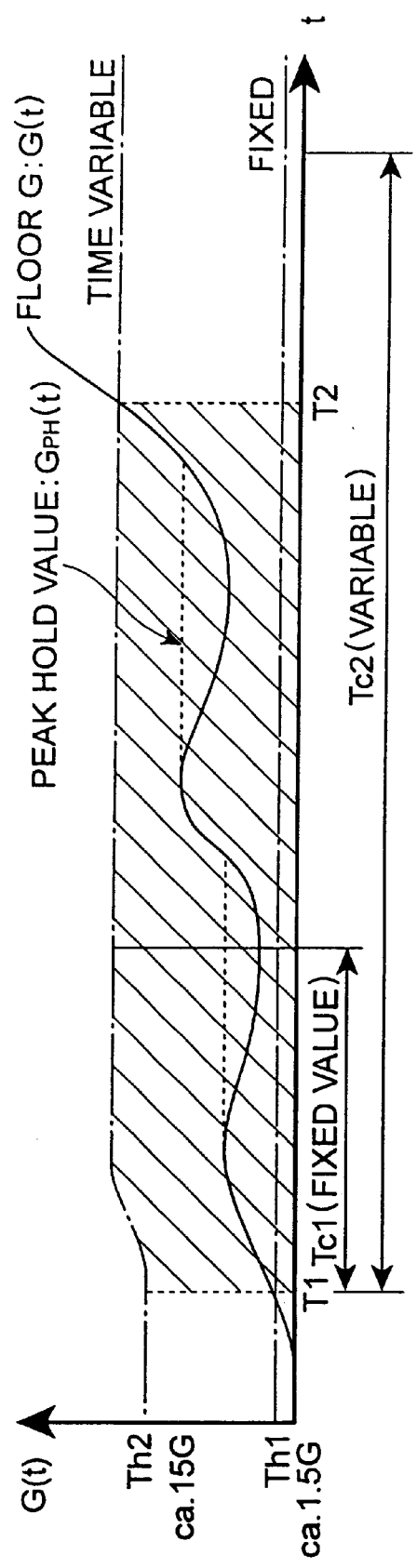
FIG. 32 is a diagram for explaining the determination of soft crash carried out in the activation control apparatus of the airbag system according to the second embodiment.
Figures 33, 34:
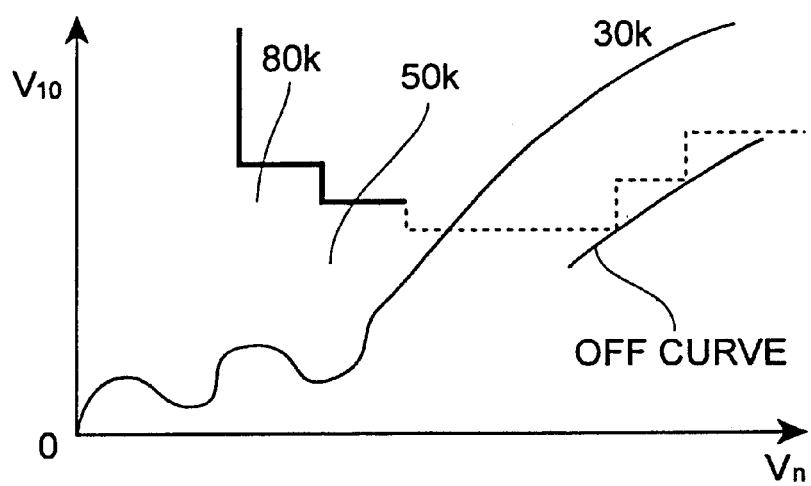
FIG. 33 is a diagram for explaining the determination of soft crash carried out in the activation control apparatus of the airbag system according to the second embodiment.
FIG. 34 is an activation determination map used in the case of the soft crash in the activation control apparatus of the airbag system according to the second embodiment.

Further, a condition for determination discontinuation may also be set in the determination of the soft crash in the second embodiment. The determination of the soft crash is carried out when the collision is finally determined as a symmetric collision, based on the outputs from the front sensors 30A, 30B. Namely, when the condition of T2>Tc2 is met in FIG. 32, the determination of the soft crash is not carried out, whereby an ODB crash is prevented from being identified as a soft crash. As illustrated in FIG. 33, the values of Tc2 are values determined based on peak hold values.

In the second embodiment the activation determination map illustrated in FIG. 34 may also be employed as an activation determination map in the case of the collision being identified as a soft crash. This activation determination map has the nature of a high output map in the portion indicated by the thick solid line and also has the nature of a low output map in the portion indicated by the dashed line. Namely, when the output waveform G(t) of the floor sensor 32 in the case of the soft crash interferes with the portion indicated by the thick solid line, the airbag system is activated at the high output of the inflators. When it interferes with the portion indicated by the dashed line, the airbag system is activated at the low output of the inflator.

According to the present invention, the collision type identifying means can identify the collision type of the vehicle as either the oblique crash, the offset crash, or the like with accuracy, and thus the activation control means can activate the occupant safety system more accurately.

According to the present invention, the likelihood computing means classifies the collision of the vehicle into either of the frontal crash, the offset crash, and the oblique crash, based on the values detected by the first impact detecting means and by the second impact detecting means, and computes the likelihood of the collision classified. Therefore, the apparatus can determine the collision type of the vehicle accurately and can activate the occupant safety system with accuracy.

According to the present invention, the likelihood computing means classifies the collision into either of the oblique crash, the offset crash, the ODB crash, and the soft crash and computes the likelihood of the collision classified. The activation control means controls the activation of the occupant safety system with reference to the threshold corresponding to the likelihood of the collision classified. Therefore, the apparatus can activate the occupant safety system at accurate timing.

According to the present invention, the likelihood computing means classifies the collision of the vehicle into either of the frontal crash, the offset crash, and the oblique crash, based on the ratio of the values detected by the first impact detecting means and by the second impact detecting means, and thus the collision can be classified with accuracy.

According to the present invention, the likelihood computing means classifies the collision of the vehicle into either the ODB crash or the ORB crash and computes the likelihood of the ODB crash, based on the initial deviation between the values detected by the first impact detecting means and by the second impact detecting means, whereby the collision can be classified with accuracy and whereby the accurate likelihood can be computed.

According to the present invention, the likelihood computing means determines whether the collision of the vehicle is the ODB crash and computes the likelihood of the ODB crash, based on the magnitude of the difference between the values detected by the first impact detecting means and by the second impact detecting means, whereby the collision can be classified with accuracy and whereby the accurate likelihood can be computed.

According to the present invention, the likelihood computing means determines whether the collision of the vehicle is the soft crash and computes the likelihood of the soft crash, based on the state of unevenness of the temporal change waveform of the measurement measured by the impact measuring means, whereby the collision can be determined with accuracy and whereby the accurate likelihood can be computed.

According to the present invention, the soft crash determining means determines whether the collision of the vehicle is the soft crash, based on the state of unevenness of the temporal change waveform of the measurement measured by the impact measuring means. Therefore, the apparatus can accurately determine whether the collision is the soft crash and can activate the occupant safety system with accuracy.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An activation control apparatus of an occupant safety system for controlling activation of the occupant safety system mounted on a vehicle in the event of the vehicle colliding with an obstacle, said activation control apparatus comprising:

a plurality of impact detecting means placed at mutually different positions in a front part of the vehicle, each of said impact detecting means detecting a value that varies with time;

collision type identifying means for identifying a type of collision of said vehicle, based on values detected by said plurality of impact detecting means; and activation control means for controlling the activation of the occupant safety system, based on the type of collision identified by said collision type identifying means.

2. The activation control apparatus according to claim 1, wherein said plurality of impact detecting means comprise first impact detecting means mounted in a left part of said vehicle and second impact detecting means mounted in a right part of said vehicle and wherein said collision type identifying means identifies the type of collision as an oblique crash if after the collision of the vehicle there is a time difference between rises of the values detected by the first impact detecting means and by the second impact detecting means.

3. The activation control apparatus according to claim 1, wherein said plurality of impact detecting means comprise first impact detecting means mounted in a left part of said vehicle and second impact detecting means mounted in a right part of said vehicle and wherein said collision type identifying means identifies the type of collision as an offset crash if after the collision of the vehicle there is a time difference between rises of the values detected by the first impact detecting means and by the second impact detecting means and if a difference is large between magnitudes of the values detected by said first impact detecting means and by said second impact detecting means.

4. The activation control apparatus according to claim 1, wherein each of said first impact detecting means and said second impact detecting means is an electronic deceleration sensor.

* * * * *